United States Patent [19]

Feistel et al.

[11] Patent Number: 5,052,834

[45] Date of Patent: Oct. 1, 1991

[54] SYSTEM AND METHOD OF PRINTING SIDEWAYS

[75] Inventors: Claude H. Feistel, Austin; Subhash R. Vohra, Round Rock, both of Tex.

[73] Assignee: International Business Machines Corporation, Armonk, N.Y.

[21] Appl. No.: 529,764

[22] Filed: May 25, 1990

Related U.S. Application Data

[63] Continuation of Ser. No. 338,474, Apr. 14, 1989, abandoned, which is a continuation of Ser. No. 90,878, Aug. 31, 1987, abandoned.

[51] Int. Cl.[5] .............................................. B41J 2/485

[52] U.S. Cl. ...................................... 400/121; 400/76; 340/735; 364/518; 364/235.4

[58] Field of Search ...................... 400/61, 62, 63, 76, 400/121; 340/723, 727, 735; 364/518, 519, 520, 521, 235.4

[56] References Cited

U.S. PATENT DOCUMENTS

| | | | |
|---|---|---|---|
| 4,312,0945 | 1/1982 | Jean et al. | 364/900 |
| 3,678,497 | 7/1972 | Watson | 400/723 X |
| 3,968,868 | 7/1976 | Greek | 400/63 |
| 4,000,486 | 12/1976 | Schomberg | 340/728 |
| 4,539,653 | 9/1985 | Bartlett | 364/900 |
| 4,553,214 | 11/1985 | Dettmer | 364/521 |
| 4,577,982 | 3/1986 | Sasaki | 400/17 |
| 4,655,622 | 4/1987 | Aoki | 400/121 |
| 4,703,323 | 10/1987 | Troupes | 340/723 X |
| 4,716,533 | 12/1987 | Ohmori | 364/518 |
| 4,741,635 | 5/1988 | Shibata | 400/121 |
| 4,931,960 | 6/1990 | Morikawa | 364/519 |

FOREIGN PATENT DOCUMENTS

| | | | |
|---|---|---|---|
| 119396 | 9/1984 | European Pat. Off. | 340/735 |
| 66658 | 4/1986 | Japan | 400/121 |
| 109658 | 5/1987 | Japan | 340/727 |

OTHER PUBLICATIONS

"Sideways Printing", Research Disclosures, May 1987.

Fedak, J. F. Findley G. I., "Advanced Function Printing With Efficient Storage Utilization", IBM TDB vol. 25, No. 3B. Aug. 1982, pp. 1650–1651.

Hanna S. D., "Rotated Page Half-Indexing", IBM TDB, vol. 24, No. 1B, Jun. 1981, pp. 819–820.

*Primary Examiner*—David A. Wiecking

*Attorney, Agent, or Firm*—Marilyn D. Smith; Mark E. McBurney

[57] ABSTRACT

The system and method of this invention controls the presentation of a text document from a processing system to a printer for printing rotated and non-rotated text within the same document. The portion of text that is to be printed sideways is designated by inserting a marker at the beginning and end of the portion of the text selected for rotation. The data stream between the markers representing the selected portion of text is stored in a buffer in the processing system in one sequence, and accessed from the buffer in a different sequence. The printer prints the data stream before the marker with an internal font having normal characters. When the first marker in the data stream is sensed, the printer is sent a control to change fonts. The printer prints the data stream in a different sequence after the first marker with an internal font having either left or right rotated characters. When the second marker is sensed, the printer changes fonts and prints the data stream after the second marker with the font having normal characters.

8 Claims, 28 Drawing Sheets

40 ROTATE PRINT DEFAULTS

| | |
|---|---|
| 55 Character Rotation | : Left (90 degrees counter clock-wise) |
| 56 Character Spacing | : 12 Pitch |
| 43 Line Spacing | : 2.36/cm or 6/inch |
| 44 Longest Line Length | : 128 Characters |
| 45 Maximum Lines/page | : 48 |
| 46 Paper Size: | |
| - For US | : 215.9x279.4 mm or 8.5x11 inches (P4). |
| - For WT | : 210x297 mm or 8.27x11.69 inches (A4). |
| 47 Automatic Centering | : Yes |
| 48 Rotated Font id | : 73 |
| 53 Start Rotate Print Marker | : ,START. ROTATE, 41 |
| 54 Stop Rotate Print Marker | : ,STOP. ROTATE, 42 |
| Active Printer Port | : LPT1 |
| Insert Line Feed after Carriage Return | : No |
| Insert Carriage Return after Line Feed | : No |

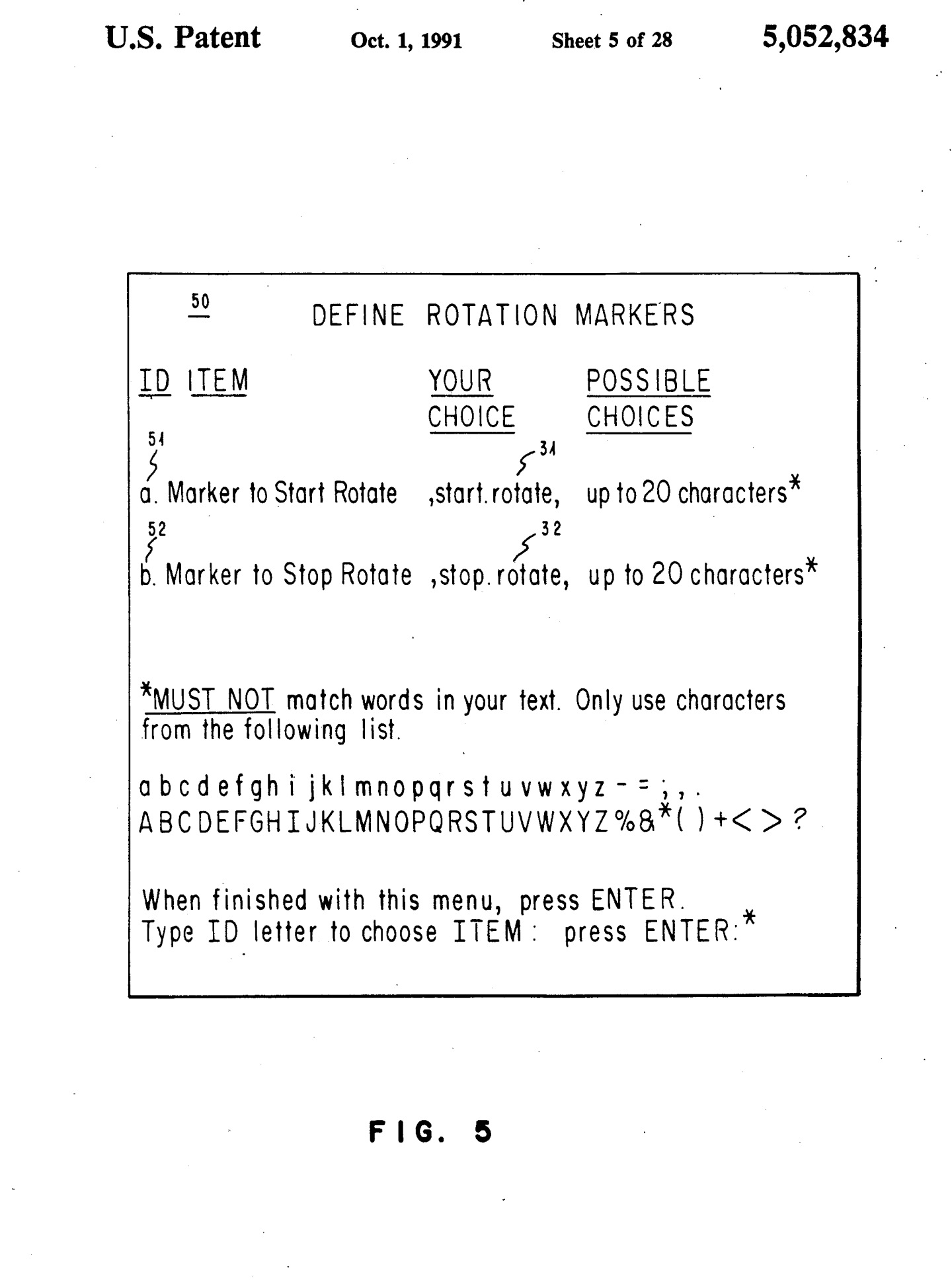

DEFINE ROTATION MARKERS

| ID ITEM | YOUR CHOICE | POSSIBLE CHOICES |
|---|---|---|
| 51 a. Marker to Start Rotate | 31 ,start.rotate, | up to 20 characters* |
| 52 b. Marker to Stop Rotate | 32 ,stop.rotate, | up to 20 characters* |

*MUST NOT match words in your text. Only use characters from the following list.

a b c d e f g h i j k l m n o p q r s t u v w x y z - = ; , .
A B C D E F G H I J K L M N O P Q R S T U V W X Y Z % & * ( ) + < > ?

When finished with this menu, press ENTER.
Type ID letter to choose ITEM : press ENTER:*

FIG. 5

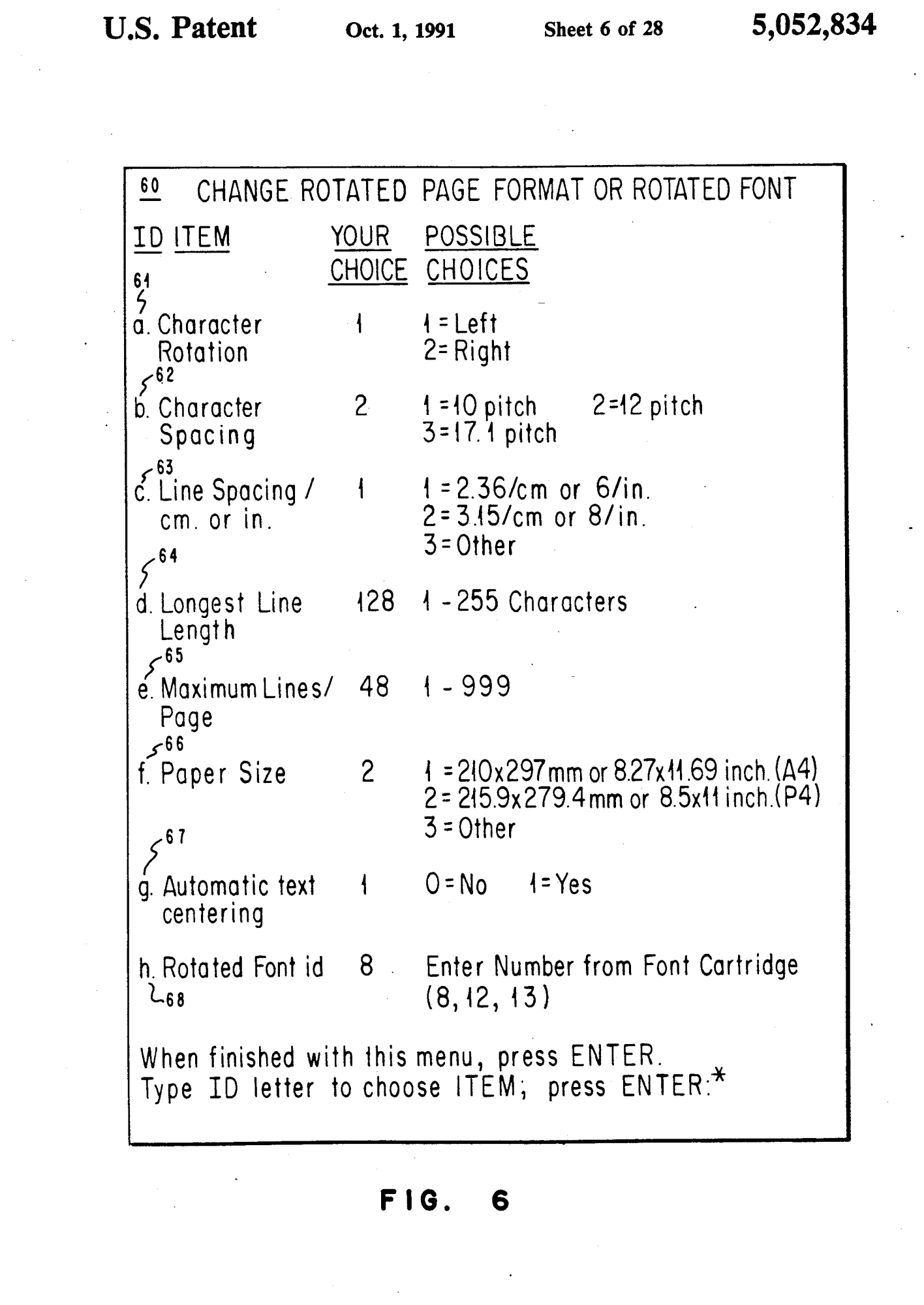

60 CHANGE ROTATED PAGE FORMAT OR ROTATED FONT

| ID ITEM | YOUR CHOICE | POSSIBLE CHOICES |
|---|---|---|
| 61 a. Character Rotation | 1 | 1 = Left<br>2 = Right |
| 62 b. Character Spacing | 2 | 1 = 10 pitch 2 = 12 pitch<br>3 = 17.1 pitch |
| 63 c. Line Spacing / cm. or in. | 1 | 1 = 2.36/cm or 6/in.<br>2 = 3.15/cm or 8/in.<br>3 = Other |
| 64 d. Longest Line Length | 128 | 1 - 255 Characters |
| 65 e. Maximum Lines/ Page | 48 | 1 - 999 |
| 66 f. Paper Size | 2 | 1 = 210x297mm or 8.27x11.69 inch. (A4)<br>2 = 215.9x279.4mm or 8.5x11 inch. (P4)<br>3 = Other |
| 67 g. Automatic text centering | 1 | 0 = No 1 = Yes |
| h. Rotated Font id 68 | 8 | Enter Number from Font Cartridge (8, 12, 13) |

When finished with this menu, press ENTER.
Type ID letter to choose ITEM; press ENTER:*

FIG. 6

ROW 1 COLUMN 1

71

70

ROW 1 COLUMN N

| | | | | | | | | | | | | | | | | | | | | | | | |
|---|---|---|---|---|---|---|---|---|---|---|---|---|---|---|---|---|---|---|---|---|---|---|---|
| 20 | 20 | 20 | 20 | 20 | 20 | 20 | 20 | 20 | 20 | 20 | 20 | 20 | 20 | 20 | 20 | 20 | 20 | 20 | 20 | 0D | 0A | | |
| 20 | 20 | 20 | 20 | 20 | 20 | 20 | 20 | 20 | 20 | 20 | 20 | 20 | 20 | 20 | 20 | 20 | 20 | 20 | 20 | 0D | 0A | | |
| 20 | 20 | 20 | 20 | 20 | 20 | 20 | 20 | 20 | 20 | 20 | 20 | 20 | 20 | 20 | 20 | 20 | 20 | 20 | 20 | 0D | 0A | | |
| 20 | 20 | 20 | 20 | 20 | 20 | 20 | 20 | 20 | 20 | 20 | 20 | 20 | 20 | 20 | 20 | 20 | 20 | 20 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 31 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 32 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 33 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 34 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 35 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 36 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 37 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 38 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 39 | 20 | 0D | 0A | | |
| 52 | 6f | 74 | 61 | 74 | 65 | 64 | 20 | 74 | 65 | 78 | 74 | 20 | 6C | 69 | 6E | 65 | 20 | 31 | 30 | 0D | 0A | | |
| 52 | 6f | 74 | 61 | 74 | 65 | 64 | 20 | 74 | 65 | 78 | 74 | 20 | 6C | 69 | 6E | 65 | 20 | 31 | 31 | 0D | 0A | | |
| 52 | 6f | 74 | 61 | 74 | 65 | 64 | 20 | 74 | 65 | 78 | 74 | 20 | 6C | 69 | 6E | 65 | 20 | 31 | 32 | 0D | 0A | | |
| | | | | | | | | | | | | | | | | | | | | | | | |
| | | | | | | | | | | | | | | | | | | | | | | | |
| | | | | | | | | | | | | | | | | | | | | | | | |
| | | | | | | | | | | | | | | | | | | | | | | | |
| | | | | | | | | | | | | | | | | | | | | | | | |
| | | | | | | | | | | | | | | | | | | | | | | | |
| | | | | | | | | | | | | | | | | | | | | | | | |
| | | | | | | | | | | | | | | | | | | | | | | | |

77

ROW N COLUMN 1

ROW N COLUMN N

FIG. 7B

LEFT ROTATED FONT CODE PAGE

RIGHT ROTATED FONT CODE PAGE

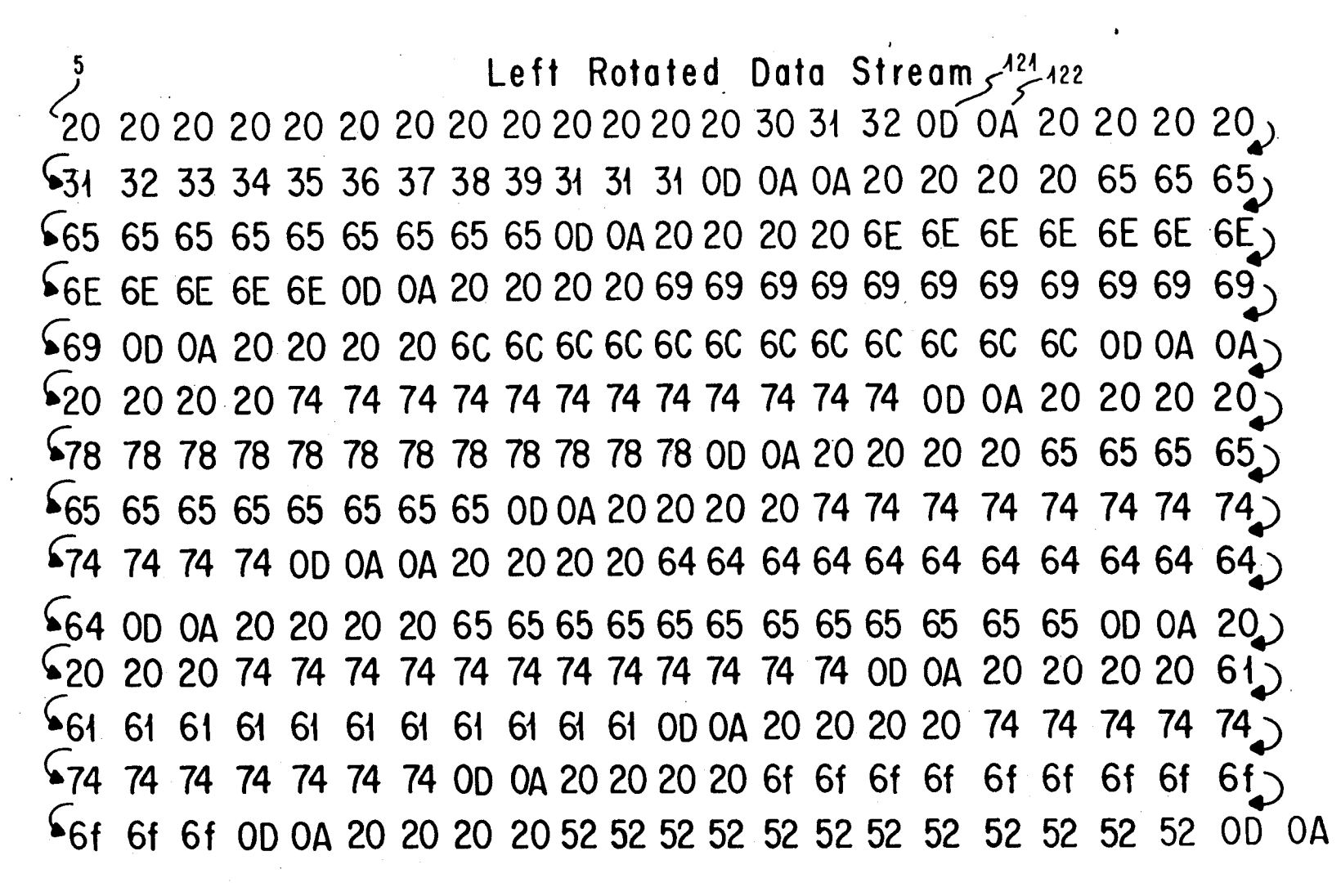

Left Rotated Data Stream

| | | | | | | | | | | | | | | | | | | | | | | |
|---|---|---|---|---|---|---|---|---|---|---|---|---|---|---|---|---|---|---|---|---|---|---|
| 20 | 20 | 20 | 20 | 20 | 20 | 20 | 20 | 20 | 20 | 20 | 20 | 20 | 30 | 31 | 32 | 0D | 0A | 20 | 20 | 20 | 20 | |
| 31 | 32 | 33 | 34 | 35 | 36 | 37 | 38 | 39 | 31 | 31 | 31 | 0D | 0A | 0A | 20 | 20 | 20 | 20 | 65 | 65 | 65 | |
| 65 | 65 | 65 | 65 | 65 | 65 | 65 | 65 | 65 | 0D | 0A | 20 | 20 | 20 | 20 | 6E | 6E | 6E | 6E | 6E | 6E | 6E | |
| 6E | 6E | 6E | 6E | 6E | 0D | 0A | 20 | 20 | 20 | 20 | 69 | 69 | 69 | 69 | 69 | 69 | 69 | 69 | 69 | 69 | 69 | |
| 69 | 0D | 0A | 20 | 20 | 20 | 20 | 6C | 6C | 6C | 6C | 6C | 6C | 6C | 6C | 6C | 6C | 6C | 6C | 0D | 0A | 0A | |
| 20 | 20 | 20 | 20 | 74 | 74 | 74 | 74 | 74 | 74 | 74 | 74 | 74 | 74 | 74 | 74 | 0D | 0A | 20 | 20 | 20 | 20 | |
| 78 | 78 | 78 | 78 | 78 | 78 | 78 | 78 | 78 | 78 | 78 | 78 | 0D | 0A | 20 | 20 | 20 | 20 | 65 | 65 | 65 | 65 | |
| 65 | 65 | 65 | 65 | 65 | 65 | 65 | 65 | 0D | 0A | 20 | 20 | 20 | 20 | 74 | 74 | 74 | 74 | 74 | 74 | 74 | 74 | |
| 74 | 74 | 74 | 74 | 0D | 0A | 0A | 20 | 20 | 20 | 20 | 64 | 64 | 64 | 64 | 64 | 64 | 64 | 64 | 64 | 64 | 64 | |
| 64 | 0D | 0A | 20 | 20 | 20 | 20 | 65 | 65 | 65 | 65 | 65 | 65 | 65 | 65 | 65 | 65 | 65 | 65 | 0D | 0A | 20 | |
| 20 | 20 | 20 | 74 | 74 | 74 | 74 | 74 | 74 | 74 | 74 | 74 | 74 | 74 | 74 | 0D | 0A | 20 | 20 | 20 | 20 | 61 | |
| 61 | 61 | 61 | 61 | 61 | 61 | 61 | 61 | 61 | 61 | 61 | 0D | 0A | 20 | 20 | 20 | 20 | 74 | 74 | 74 | 74 | 74 | |
| 74 | 74 | 74 | 74 | 74 | 74 | 74 | 0D | 0A | 20 | 20 | 20 | 20 | 6f | 6f | 6f | 6f | 6f | 6f | 6f | 6f | 6f | |
| 6f | 6f | 6f | 0D | 0A | 20 | 20 | 20 | 20 | 52 | 52 | 52 | 52 | 52 | 52 | 52 | 52 | 52 | 52 | 52 | 52 | 0D | 0A |

FIG. 12B

Right Rotated Data Stream

15

| | | | | | | | | | | | | | | |
|---|---|---|---|---|---|---|---|---|---|---|---|---|---|---|
| 52 | 52 | 52 | 52 | 52 | 52 | 52 | 52 | 52 | 52 | 52 | 52 | 0D | 0A | |
| 6f | 6f | 6f | 6f | 6f | 6f | 6f | 6f | 6f | 6f | 6f | 6f | 0D | 0A | |
| 74 | 74 | 74 | 74 | 74 | 74 | 74 | 74 | 74 | 74 | 74 | 74 | 0D | 0A | |
| 61 | 61 | 61 | 61 | 61 | 61 | 61 | 61 | 61 | 61 | 61 | 61 | 0D | 0A | |
| 74 | 74 | 74 | 74 | 74 | 74 | 74 | 74 | 74 | 74 | 74 | 74 | 0D | 0A | |
| 65 | 65 | 65 | 65 | 65 | 65 | 65 | 65 | 65 | 65 | 65 | 65 | 0D | 0A | |
| 64 | 64 | 64 | 64 | 64 | 64 | 64 | 64 | 64 | 64 | 64 | 64 | 0D | 0A | 0A |
| 74 | 74 | 74 | 74 | 74 | 74 | 74 | 74 | 74 | 74 | 74 | 74 | 0D | 0A | |
| 65 | 65 | 65 | 65 | 65 | 65 | 65 | 65 | 65 | 65 | 65 | 65 | 0D | 0A | |
| 78 | 78 | 78 | 78 | 78 | 78 | 78 | 78 | 78 | 78 | 78 | 78 | 0D | 0A | |
| 74 | 74 | 74 | 74 | 74 | 74 | 74 | 74 | 74 | 74 | 74 | 74 | 0D | 0A | 0A |
| 6C | 6C | 6C | 6C | 6C | 6C | 6C | 6C | 6C | 6C | 6C | 6C | 0D | 0A | |
| 69 | 69 | 69 | 69 | 69 | 69 | 69 | 69 | 69 | 69 | 69 | 69 | 0D | 0A | |
| 6E | 6E | 6E | 6E | 6E | 6E | 6E | 6E | 6E | 6E | 6E | 6E | 0D | 0A | |
| 65 | 65 | 65 | 65 | 65 | 65 | 65 | 65 | 65 | 65 | 65 | 65 | 0D | 0A | 0A |
| 31 | 31 | 31 | 39 | 38 | 37 | 36 | 35 | 34 | 33 | 32 | 31 | 0D | 0A | |
| 32 | 31 | 30 | 0D | 0A | | | | | | | | | | |

FIG. 13B

SINGLE BYTE CONTROLS

150

| CODE | HEX | DESCRIPTION |
|---|---|---|
| NUL | 00 | NULL, TAB SET SEQUENCE DELIMINATOR |
| BEL | 07 | BELL |
| BS | 08 | BACKSPACE |
| 163 HT | 09 | HORIZONTAL TAB |
| LF | 0A | LINE FEED |
| VT | 0B | VERTICAL TAB |
| 164 FF | 0C | FORM FEED |
| CR | 0D | CARRIER RETURN |
| SO | 0E | SHIFT OUT |
| SI | 0F | SHIFT IN (SELECT 17.1 PITCH) |
| 152 DC1 | 11 | SELECT PRINTER |
| DC2 | 12 | SELECT 10 PITCH |
| DC4 | 14 | CANCEL SO MODE |
| CAN | 18 | CANCEL |
| ESC | 1B | ESCAPE |

FIG. 15A

ESCAPE SEQUENCES AND CONTROL SEQUENCES FUNCTIONS

150

| | CODE | HEX | DESCRIPTION |
|---|---|---|---|
| | ESC SO | 0E | SHIFT OUT |
| 156 | ESC SI | 0F | SHIFT IN |
| 155 | ESC - n | 2D | BEGIN/END UNDERSCORE |
| | ESC 0 | 30 | 1/8 INCH LINE SPACING (8 LINES PER INCH) |
| 165 | ESC 2 | 32 | INVOKE VARIABLE LINE SPACING |
| | ESC 3 n | 33 | SET GRAPHICS LINE SPACING |
| | ESC 5 n | 35 | SET/RESET AUTO LINE FEED MODE |
| | ESC 6 | 36 | SELECT PC CHARACTER SET 2 |
| 153 | ESC 7 | 37 | SELECT PC CHARACTER SET 1 |
| | ESC : | 3A | SET 12 PITCH |
| 162 | ESC = ... | 3D | FONT IMAGE DATA DOWNLOAD |
| | ESC A n | 41 | SET VARIABLE LINE SPACING |
| 154 | ESC B ... | 42 | SET VERTICAL TAB STOPS |
| | ESC C n m | 43 | SET PAGE LENGTH |
| | ESC D ... | 44 | SET HORIZONTAL TAB STOPS |
| 151 | ESC E | 45 | BEGIN EMPHASIZED PRINT |
| | ESC F | 46 | END EMPHASIZED PRINT |
| | ESC I n | 49 | CHANGE FONT |
| | ESC K ... | 4B | NORMAL DENSITY BIT IMAGE GRAPHICS |
| | ESC L ... | 4C | DUAL DENSITY BIT IMAGE GRAPHICS |
| | ESC N n | 4E | SET SKIP PERFORATION |
| | ESC O | 4F | RESET SKIP PERFORATION |
| | ESC P | 50 | BEGIN/END PROPORTIONAL SPACE MODE |
| 158 | ESC Q n | 51 | DESELECT ON POSITIVE QUERY REPLY |
| | ESC R n | 52 | SET DEFAULT TAB RACK |
| | ESC S n | 53 | SET SUBSCRIPT OR SUPERSCRIPT MODE |
| 157 | ESC T | 54 | RESET SUBSCRIPT OR SUPERSCRIPT MODE |
| | ESC W n | 57 | BEGIN/END ENLARGE PRINT CONTINUOUS MODE |
| | ESC X n m | 58 | SET LEFT AND RIGHT MARGINS |
| | ESC Y ... | 59 | DUAL DENSITY BIT IMAGE GRAPHICS |
| | ESC Z ... | 5A | HIGH DENSITY BIT IMAGE GRAPHICS |
| | ESC \ n m | 5C | PRINT ALL CHARACTERS |
| | ESC ] | 5D | REVERSE LINE FEED |
| | ESC ^ | 5E | PRINT SINGLE CHARACTER |
| | ESC h | 68 | PARTIAL INDEX DOWN |
| | ESC i | 69 | PARTIAL INDEX UP |
| | ESC j | 6A | STOP |
| 159 | ESC [ I | 49 | SET FONT GLOBAL |
| 161 | ESC [ K | 4B | SET INITIAL CONDITIONS |
| | ESC [ Q | 51 | SET PRESENTATION POSITION |
| | ESC [ T | 54 | SET CHARACTER SET GLOBAL |
| | ESC [ \ | 5C | SET UNITS |
| | ESC [ S | 73 | READ PRINTER STATUS |

FIG. 15B

CHARACTER SETS

| DECIMAL | | 0 | 16 | 32 | 48 | 64 | 80 | 96 | 112 | 128 | 144 | 160 | 176 | 192 | 208 | 224 | 240 |
|---|---|---|---|---|---|---|---|---|---|---|---|---|---|---|---|---|---|
| col + row | HEX c/r | 0 | 1 | 2 | 3 | 4 | 5 | 6 | 7 | 8 | 9 | A | B | C | D | E | F |
| 0 | 0 | | ► | SP | 0 | @ | P | ` | p | Ç | É | á | ░ | └ | ╨ | α | ≡ |
| 1 | 1 | ☺ | ◄ | ! | 1 | A | Q | a | q | ü | æ | í | ▒ | ┴ | ╤ | ß | ± |
| 2 | 2 | ☻ | ↕ | " | 2 | B | R | b | r | é | Æ | ó | ▓ | ┬ | ╥ | Γ | ≥ |
| 3 | 3 | ♥ | ‼ | # | 3 | C | S | c | s | â | ô | ú | │ | ├ | ╙ | π | ≤ |
| 4 | 4 | ♦ | ¶ | $ | 4 | D | T | d | t | ä | ö | ñ | ┤ | ─ | ╘ | Σ | ⌠ |
| 5 | 5 | ♣ | § | % | 5 | E | U | e | u | à | ò | Ñ | ╡ | ┼ | ╒ | σ | ⌡ |
| 6 | 6 | ♠ | ▬ | & | 6 | F | V | f | v | å | û | ª | ╢ | ╞ | ╓ | µ | ÷ |
| 7 | 7 | • | ↨ | ' | 7 | G | W | g | w | ç | ù | º | ╖ | ╟ | ╫ | τ | ≈ |
| 8 | 8 | ◘ | ↑ | ( | 8 | H | X | h | x | ê | ÿ | ¿ | ╕ | ╚ | ╪ | Φ | ° |
| 9 | 9 | ○ | ↓ | ) | 9 | I | Y | i | y | ë | Ö | ⌐ | ╣ | ╔ | ┘ | Θ | ∙ |
| 10 | A | ◙ | → | * | : | J | Z | j | z | è | Ü | ¬ | ║ | ╩ | ┌ | Ω | · |
| 11 | B | ♂ | ← | + | ; | K | [ | k | { | ï | ¢ | ½ | ╗ | ╦ | █ | δ | √ |
| 12 | C | ♀ | ∟ | , | < | L | \ | l | ¦ | î | £ | ¼ | ╝ | ╠ | ▄ | ∞ | ⁿ |
| 13 | D | ♪ | ↔ | - | = | M | ] | m | } | ì | ¥ | ¡ | ╜ | ═ | ▌ | φ | ² |
| 14 | E | ♫ | ▲ | . | > | N | ^ | n | ~ | Ä | ₧ | « | ╛ | ╬ | ▐ | ε | ■ |
| 15 | F | ☼ | ▼ | / | ? | O | _ | o | ⌂ | Å | ƒ | » | ┐ | ╧ | ▀ | ∩ | RSP |

APPENDIX E: ROTATED TEXT WITH HEADER AND FOOTER STRAIGHT

173

PROJECTED PROFIT AND LOSS STATEMENT -- 1986

| | 1 | 2 | 3 | 4 | 5 | 6 | 7 | 8 | 9 | 10 |
|---|---|---|---|---|---|---|---|---|---|---|
| Revenues | | | | | | | | | | |
| Prod. Sales | 285,411 | 304,262 | 327,508 | 359,309 | 357,009 | 358,419 | 382,093 | 411,285 | 417,166 | 444,720 |
| Rentals | 71,353 | 76,066 | 76,366 | 77,458 | 78,566 | 82,129 | 86,704 | 90,636 | 88,180 | 86,703 |
| Maintenance | 42,812 | 42,981 | 43,151 | 43,768 | 47,112 | 45,835 | 49,337 | 49,021 | 53,274 | 51,830 |
| TOTALS | 399,576 | 423,309 | 447,025 | 480,535 | 482,687 | 486,383 | 518,134 | 550,942 | 558,620 | 583,253 |
| Cost of Sale | | | | | | | | | | |
| Material | 155,835 | 154,704 | 153,581 | 164,912 | 168,726 | 181,175 | 185,366 | 199,042 | 213,727 | 218,671 |
| Shipping | 9,818 | 9,746 | 9,676 | 10,389 | 10,630 | 11,414 | 11,678 | 12,540 | 13,465 | 13,776 |
| Commission | 21,178 | 22,435 | 23,692 | 25,468 | 25,582 | 25,778 | 27,461 | 29,200 | 29,607 | 30,912 |
| TOTALS | 186,831 | 186,885 | 186,949 | 200,769 | 204,938 | 218,367 | 224,505 | 240,782 | 256,799 | 263,359 |
| Advertisment | | | | | | | | | | |
| Expense | 9,190 | 10,082 | 10,539 | 11,235 | 11,279 | 11,907 | 13,063 | 14,196 | 13,811 | 14,151 |
| Media Cost | 29,169 | 31,398 | 31,522 | 33,930 | 33,010 | 33,140 | 33,271 | 33,747 | 37,024 | 36,021 |
| Direct Mail | 1,250 | 1,242 | 1,298 | 1,411 | 1,475 | 1,527 | 1,580 | 1,652 | 1,624 | 1,782 |
| TOTALS | 39,609 | 42,722 | 43,359 | 46,576 | 45,764 | 46,574 | 47,914 | 49,595 | 52,459 | 51,954 |
| Overhead | | | | | | | | | | |
| Management | 16,240 | 16,304 | 16,200 | 16,096 | 15,993 | 16,056 | 15,787 | 16,176 | 16,407 | 16,132 |
| Engineering | 42,488 | 43,096 | 42,374 | 44,296 | 45,388 | 46,507 | 48,135 | 51,314 | 51,517 | 55,986 |
| Personnel | 6,012 | 6,222 | 6,569 | 6,663 | 6,965 | 7,497 | 7,992 | 8,603 | 9,260 | 9,392 |
| Insurance | 7,044 | 7,174 | 7,307 | 6,733 | 6,923 | 6,782 | 6,776 | 6,376 | 6,185 | 6,239 |
| Misc. | 3,020 | 3,063 | 3,234 | 3,481 | 3,747 | 3,762 | 3,855 | 4,030 | 3,921 | 4,139 |
| TOTALS | 74,804 | 75,859 | 75,684 | 77,269 | 79,016 | 80,604 | 82,545 | 86,499 | 87,290 | 91,888 |
| Tot. Revenue | 399,576 | 423,309 | 447,025 | 480,535 | 482,687 | 486,383 | 518,134 | 550,942 | 558,620 | 583,253 |
| Total Exp. | 301,244 | 305,466 | 305,992 | 324,614 | 329,718 | 345,545 | 354,964 | 376,876 | 396,548 | 407,201 |
| Profit | 98,332 | 117,843 | 141,033 | 155,921 | 152,969 | 140,838 | 163,170 | 174,066 | 162,072 | 176,052 |
| Taxes | 39,333 | 47,137 | 56,413 | 62,368 | 61,188 | 56,335 | 65,268 | 69,626 | 64,829 | 70,421 |
| NET PROFIT | 58,999 | 70,706 | 84,620 | 93,553 | 91,781 | 84,503 | 97,902 | 104,440 | 97,243 | 105,631 |

IMPORTANT NOTE :
All of the above numbers can be used when forecasting total growth of our company. However this is just an estimate and the profit/ loss predictions may change depending upon national economy.

181 APPENDIX F: ROTATED TEXT WITH HEADER AND FOOTER ROTATED

183

PROJECTED PROFIT AND LOSS STATEMENT -- 1986

| | 1 | 2 | 3 | 4 | 5 | 6 | 7 | 8 | 9 | 10 |
|---|---|---|---|---|---|---|---|---|---|---|
| Revenues | | | | | | | | | | |
| Prod. Sales | 285,411 | 304,262 | 327,508 | 359,309 | 357,009 | 358,419 | 382,093 | 411,285 | 417,166 | 444,720 |
| Rentals | 71,353 | 76,066 | 76,366 | 77,458 | 78,566 | 82,129 | 86,704 | 90,636 | 88,180 | 86,703 |
| Maintenance | 42,812 | 42,981 | 43,151 | 43,768 | 47,112 | 45,835 | 49,337 | 49,021 | 53,274 | 51,830 |
| TOTALS | 399,576 | 423,309 | 447,025 | 480,535 | 482,687 | 486,383 | 518,134 | 550,942 | 558,620 | 583,253 |
| Cost of Sale | | | | | | | | | | |
| Material | 155,835 | 154,704 | 153,581 | 164,912 | 168,726 | 181,175 | 185,366 | 199,042 | 213,727 | 218,671 |
| Shipping | 9,818 | 9,746 | 9,676 | 10,389 | 10,630 | 11,414 | 11,678 | 12,540 | 13,465 | 13,776 |
| Commission | 21,178 | 22,435 | 23,692 | 25,468 | 25,582 | 25,778 | 27,461 | 29,200 | 29,607 | 30,912 |
| TOTALS | 186,831 | 186,885 | 186,949 | 200,769 | 204,938 | 218,367 | 224,505 | 240,782 | 256,799 | 263,359 |
| Advertisment | | | | | | | | | | |
| Expense | 9,190 | 10,082 | 10,539 | 11,235 | 11,279 | 11,907 | 13,063 | 14,196 | 13,811 | 14,151 |
| Media Cost | 29,169 | 31,398 | 31,522 | 33,930 | 33,010 | 33,140 | 33,271 | 33,747 | 37,024 | 36,021 |
| Direct Mail | 1,250 | 1,242 | 1,298 | 1,411 | 1,475 | 1,527 | 1,580 | 1,652 | 1,624 | 1,782 |
| TOTALS | 39,609 | 42,722 | 43,359 | 46,576 | 45,764 | 46,574 | 47,914 | 49,595 | 52,459 | 51,954 |
| Overhead | | | | | | | | | | |
| Management | 16,240 | 16,304 | 16,200 | 16,096 | 15,993 | 16,056 | 15,787 | 16,176 | 16,407 | 16,132 |
| Engineering | 42,488 | 43,096 | 42,374 | 44,296 | 45,388 | 46,507 | 48,135 | 51,314 | 51,517 | 55,986 |
| Personnel | 6,012 | 6,222 | 6,569 | 6,663 | 6,965 | 7,497 | 7,992 | 8,603 | 9,260 | 9,392 |
| Insurance | 7,044 | 7,174 | 7,307 | 6,733 | 6,923 | 6,782 | 6,776 | 6,376 | 6,185 | 6,239 |
| Misc. | 3,020 | 3,063 | 3,234 | 3,481 | 3,747 | 3,762 | 3,855 | 4,030 | 3,921 | 4,139 |
| TOTALS | 74,804 | 75,859 | 75,684 | 77,269 | 79,016 | 80,604 | 82,545 | 86,499 | 87,290 | 91,888 |
| Tot. Revenue | 399,576 | 423,309 | 447,025 | 480,535 | 482,687 | 486,383 | 518,134 | 550,942 | 558,620 | 583,253 |
| Total Exp. | 301,244 | 305,466 | 305,992 | 324,614 | 329,718 | 345,545 | 354,964 | 376,876 | 396,548 | 407,201 |
| Profit | 98,332 | 117,843 | 141,033 | 155,921 | 152,969 | 140,838 | 163,170 | 174,066 | 162,072 | 176,052 |
| Taxes | 39,333 | 47,137 | 56,413 | 62,368 | 61,188 | 56,335 | 65,268 | 69,626 | 64,829 | 70,421 |
| NET PROFIT | 58,999 | 70,706 | 84,620 | 93,553 | 91,781 | 84,503 | 97,902 | 104,440 | 97,243 | 105,631 |

180

IMPORTANT NOTE :
All of the above numbers can be used when forecasting total growth of our company. However this is just an estimate and the profit/ loss predictions may change depending upon national economy.

SYSTEM LEVEL CALL STRUCTURE DIAGRAM

SYSTEM AND METHOD OF PRINTING SIDEWAYS

This is a continuation of application Ser. No. 07/338,474 filed Apr. 14, 1989 which is a continuation of Ser. No. 07/090,878, filed Aug. 31, 1987, now abandoned.

TECHNICAL FIELD

This invention relates to printing, and more specifically to the control of the presentation of a text document from a processing system to a printer.

BACKGROUND ART

It is often times desirable to print alphanumeric text from a processing system such that the text has a sideways orientation in the printed output. A sideways orientation means that the text is rotated 90 degrees on the page. The lines of text go along the length of the page instead of across the width of the page as usual.

For example, a table containing columns of data may be wider than the width of the paper in the printer. If the table of data was oriented 90 degrees, i.e., sideways, then the width of the table would run the length of the paper instead of the paper's width. Then, the table of data could be printed within the boundaries of the page.

There are several commercially available software packages that print a document sideways, and can rotate an image. Some of these include the following: "Sideways" by Funk Software Inc., "Printer Boss" by Connecticut Software Inc., "Digicon Print Pkg." by Digital Concepts Inc., and "Printworks" by Softstyle Inc..

These commercially available software packages for printing sideways only print in all points addressable (APA) mode. All points addressable mode converts a normal character code into an image of dots. This requires a great amount of data since each dot of the character has to be represented. For sideways printing, the image is rotated and sent to the printer. This method is slow because there is a lot more data to be sent per character in the APA mode. This problem is amplified in letter quality printing since there are a greater number of dots per character to produce a higher resolution letter quality character. Consequently, the amount of data that must be sent to the printer to print the character increases proportionately with the increased number of dots in the character. In APA mode, as the letter quality increases, the printing speed decreases.

Another limitation with the commercially available software for printing sideways is that the software does not support some of the important functions required in letter quality printing such as underscored text, emphasized text, superscribed, and subscripted text.

Additionally, most printers that print in APA mode do not allow the control of all of the available dots in a printer. As a result, fully formed letters cannot be printed as required by letter quality sideways printing.

As an alternative to using software to print sideways in APA mode, another method known in the art to print sideways is to use a laser jet printer which rotates the characters to be printed. One known laser jet printer is made by Hewlett Packard. This printer contains a font having characters that are rotated sideways. In utilizing this type of printer, the processing system would send a normal character to the printer through a data stream, and the printer would rotate the character and print the character using the rotated font.

There are several problems with using a printer of this sort to print sideways. First, a printer that contains the ability to rotate characters is necessarily equipped with additional utilities to perform this function which increases the cost of the printer. Secondly, there is no way to automatically intermingle regular text with rotated text within the same document that is generated within the processing system and sent to the printer. To print sideways, the printer has to be switched to the sideways printing mode.

Also, in these type of printers, the code to support sideways printing is resident in the printer. Therefore, the cost of extra ROS and RAM (for a page buffer required for rotation) is added in the base material cost of the printer.

Another factor in using these printers is that a series of escape sequences, i.e. printer controls, are sent by the user to select a rotated font for sideways printing. These sequences are typically long and complicated. In addition, the definition of the escape controls in a printer of this type do not match with any standards or other ASCII printers. It is well noted that there are many application programs on the market which do not allow insertion of printer controls in the text. As a result, the user of these applications can not intermix normal and rotated printing in a single document.

For example, it may be desired to print a graph or a chart having horizontal and vertical axes. The horizontal axis may be labeled using ordinary printed text, but the vertical axis may have a better appearance if it were labeled using text that was oriented along the vertical axis, i.e., rotated 90 degrees from the horizontal text. In this example, both regular text and rotated text would be intermixed throughout the printed output. A printer that printed sideways as mentioned above could not automatically switch between regular printing and sideways printing within one document.

SUMMARY OF THE INVENTION

It is therefor an object of this invention to print letter quality characters sideways, either rotated left or right.

It is a further object of this invention to intermix regular text and rotated text within the same printed document.

It is a further object of this invention to rotate text at any selected location in a document.

It is a further object of this invention to increase the speed of sideways letter quality printing.

It is a further object of this invention to support common printer controls such as emphasis print, underscored text, superscripts/subscripts, set margins, set line spacing, set page length, etc. in a sideways printing mode.

The system and method of this invention for printing sideways text from a processing system to a printer comprises the combination of an application program having a rotate print utility for use with a word processing application in a processing system, and a printer connected to the processing system having a left and right font with rotated characters. Since the rotate print utility resides in an application program in the processing system, no extra cost is added in the base material cost of the printer for the rotated function.

The rotate print utility application allows a user to select and designate a portion of the text within a word processing application that is to be printed sideways by the printer. This allows the intermixing of both rotated and normal text within a single document. In the rotate print utility, the rotated font is selected by simply typing a predefined text such as a string of characters inside the document being edited. This allows switching fonts from normal to left or right rotated fonts anywhere inside the document in all supported applications.

The rotate print utility intercepts the data going to the printer from the word processing application and examines the data for a rotated text designation. If no designation is found, the rotate print utility sends the print data to the printer. If a rotated text designation is found, the rotate print utility buffers the designated text selected for rotation in local storage such as RAM.

The rotate print utility rotates the selected text either clockwise or counter clockwise, as selected by a user, by sending the data in the buffer to the printer in a specific sequence (either starting with the last column, first row; or starting with the first column, last row) depending on either a left or right rotation. The rotate print utility selects the corresponding right or left rotated character font in the printer, and sends the character codes for the characters that are to be printed sideways to the printer in the specific sequence. The printer then prints the character on the font corresponding to the character code sent by the rotate print utility. Each character printed by the font and the selected text as a whole will be rotated on the printed output 90 degrees.

BRIEF DESCRIPTION OF THE DRAWING

FIG. 4 is a table showing the default parameters of the rotate print utility.

FIG. 5 shows an option menu for specifying the character strings to be used to start and stop rotation.

FIG. 6 shows an option menu for changing the rotate print utility default parameters.

FIG. 7B shows the ASCII codes of the text to be rotated in the matrix storage buffer.

FIG. 12B shows the ASCII data stream sequence sent from the matrix buffer to the printer for left rotated text.

FIG. 13B shows the ASCII data stream sequence sent from the matrix buffer to the printer for right rotated text.

FIG. 15A is a table listing single byte print controls.

FIG. 15B is a table listing codes for print control functions.

FIG. 16 shows a typical character code table for n -rotated (normal) text.

FIG. 17 illustrates a printed document with rotated text between non-rotated headers and footers.

FIG. 18 illustrates a printed document with rotated text between rotated headers and footers.

DESCRIPTION OF THE PREFERRED EMBODIMENTS

Figure 1:
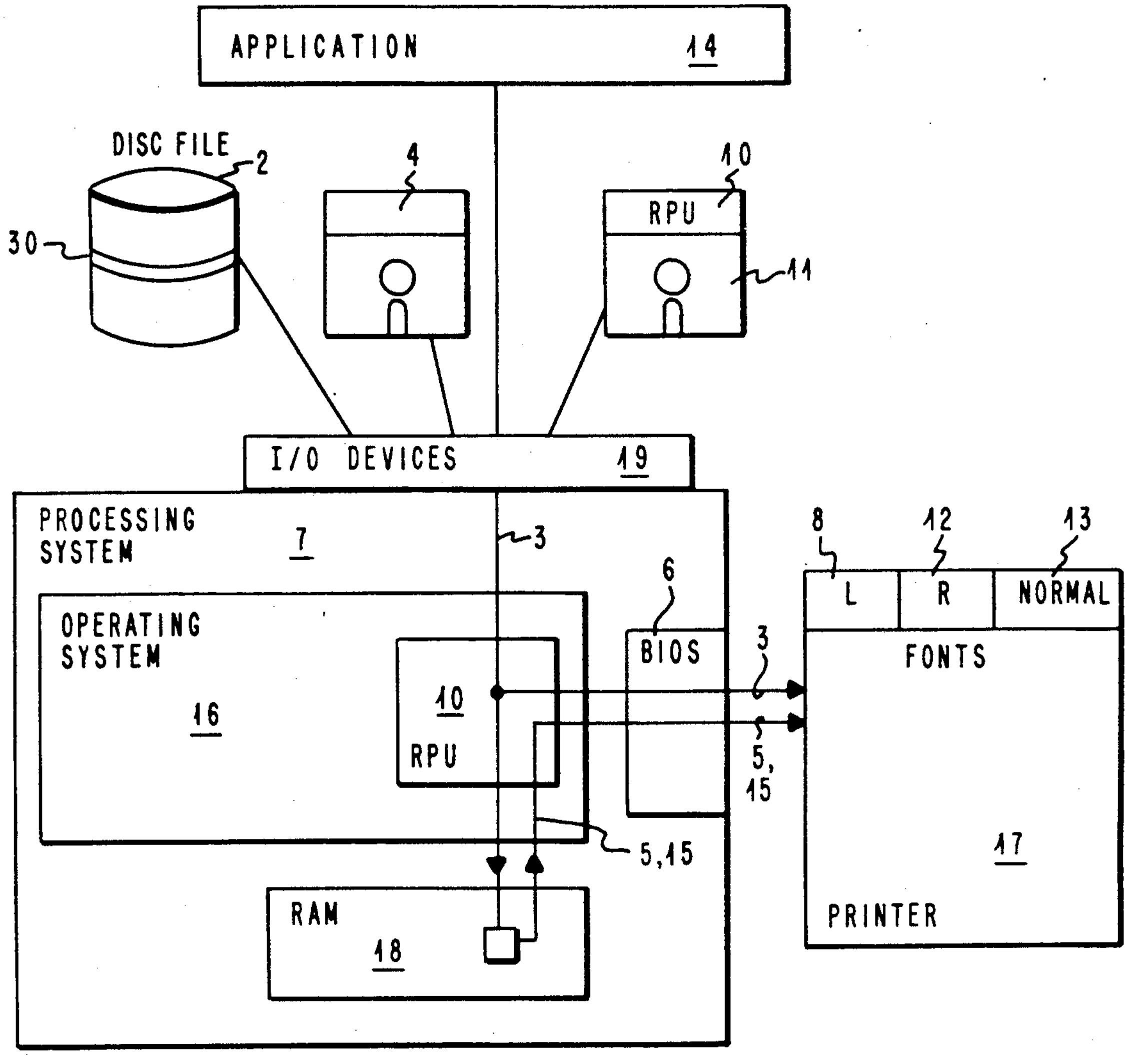
FIG. 1 shows the rotate print utility in a processing system connected to a printer.

The system of this invention, as shown in FIG. 1 comprises a rotate print utility (RPU) 10, a printer 17, and a processing system 7. The rotate print utility 10 is implemented as a software package made available on a diskette 11 such as a 5¼" or 3½" diskette. In a preferred embodiment the printer 17 is an IBM Quietwriter printer modified with left and right rotated fonts 8, 12. In a preferred embodiment, the processing system 7 is a personal computer, such as an IBM Personal Computer, having an operating system 16 such as DOS. Additional information concerning the Disk Operating System (DOS) by Microsoft Corp. can be found in the IBM Personal Computer Language Series *Disk Operating System*, #1502343, which is herein incorporated by reference. The user installs the rotate print utility 10 on the operating system 16 or the application 14 by executing the DOS program INSTALL.BAT to copy all necessary files from the rotate print utility diskette 11 onto the user's own operating system 16 or application diskette 14. The user then types "INSTALL" after inserting the proper diskettes into the I/O device 19 of the processing system 7.

After initializing the operating system 16 and installing the rotate print utility 10, the user loads the rotate print utility program 10 by typing "RPU" or by automatically loading the rotate print utility driver by using the AUTOEXEC.BAT file in the DOS operating system 16. The user can load any application program 14 after loading the rotate print utility program 10. The rotate print utility 10 remains resident as a part of the operating system 16 even after the application program 14 is loaded.

The user can also deactivate, reactivate, and reinitialize the rotate print utility program 10 by the following commands after the DOS prompt >A:

>A RPU Loads the program 10 into the system 7 from the diskette 11. If the program 10 is already loaded but deactivated, then it activates the program 10.

>A RPU /I If the rotate print utility program 10 is not loaded, it loads the program 10 from the diskette 11. If the program 10 is deactivated, it activates the program 10. It initializes all parameters (FIG. 4) of the rotate print utility program 10.

>A RPU /D Deactivates the rotate print utility program 10. The system 7 acts as if the program 10 is not present. To reactivate, the option "RPU" with no parameters is typed.

Figure 14:
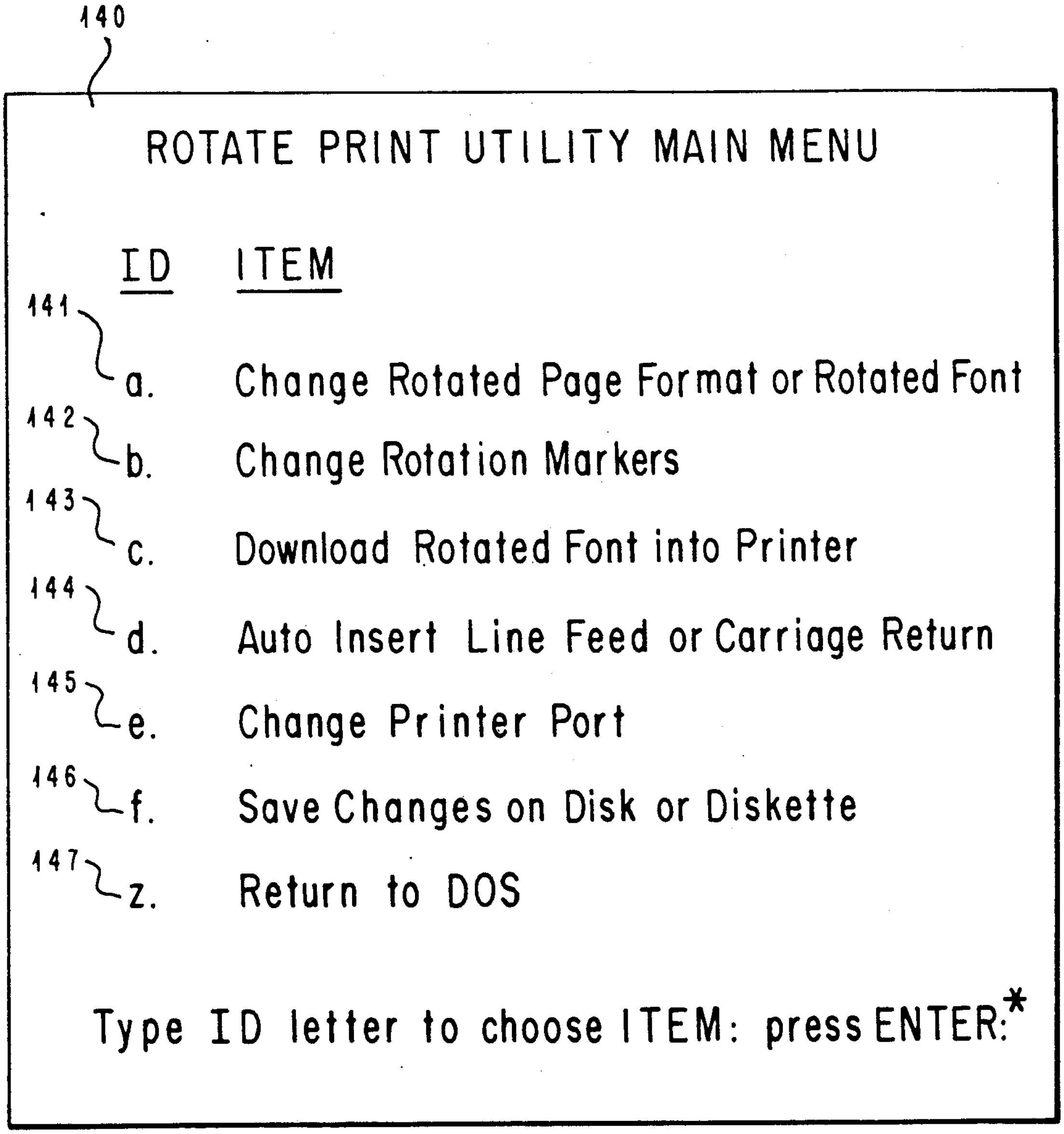
FIG. 14 shows the rotate print utility main menu.

>A RPU / O Displays the main option menu (FIG. 14). The user can select different options to change parameters (if defaults are not to be used) as described later.

With the rotate print utility program 10 loaded in the system 7, and resident in the operating system 16, as stated above, a user is able to run another application 14 such as a word processing program, such as "Display-Write 3" by IBM, in conjunction with the rotate print utility 10 to print text in a rotated fashion anywhere within a document. Additional information concerning "DisplayWrite 3" is found in *IBM DisplayWrite Series DisplayWrite* 3, User's Guide, volumes 1 and 2, part numbers 6280841 and 6280843, respectively, which are herein incorporated by reference.

Figure 2:
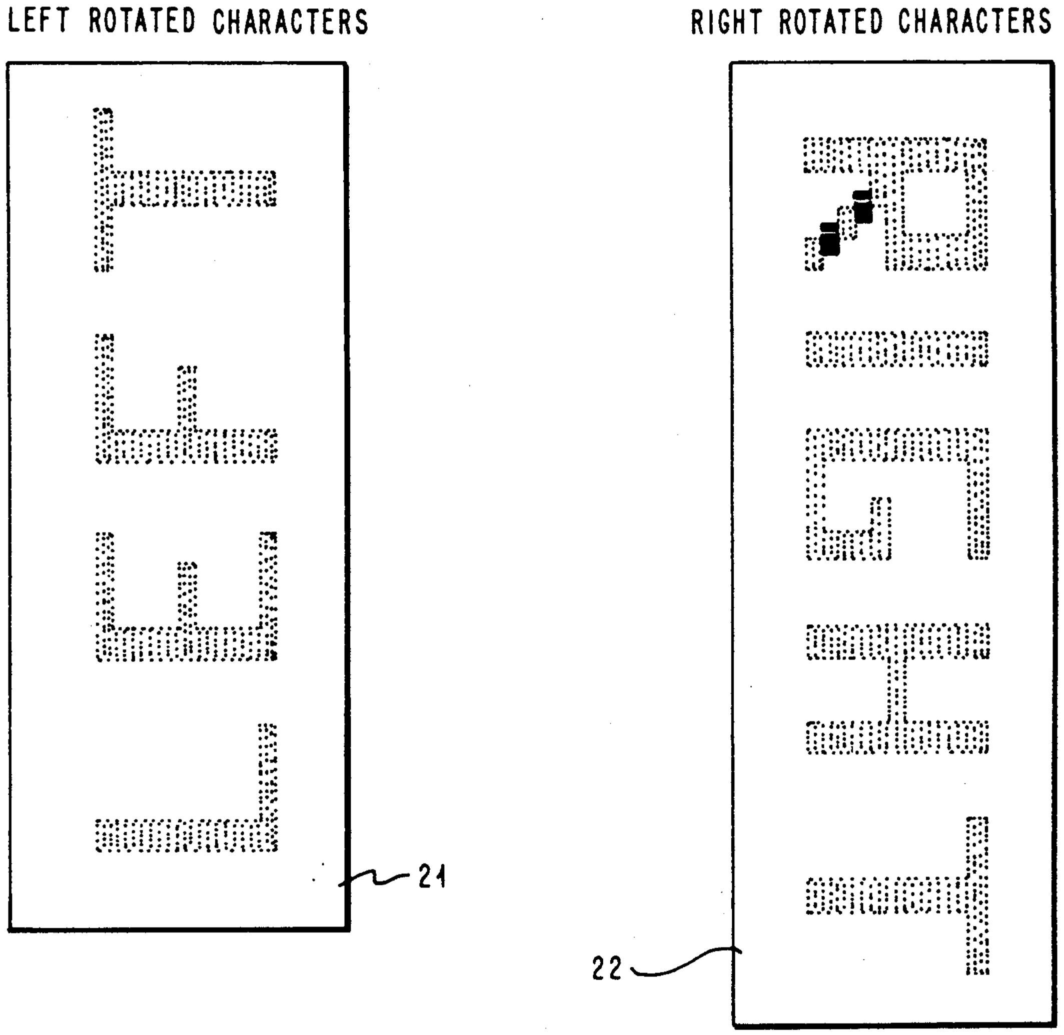
FIG. 2 shows examples of left and right rotated characters.

FIG. 2 illustrates text which is rotated 90 degrees to the left, left rotated characters 21, and text which is rotated 90 degrees to the right, right rotated characters 22.

The following are three methods to activate the rotate function of the rotate print utility 10:

1. By using a special character string in the print data.
2. By using the Set Font Global (SFG) control in the print data.
3. By using a special command in DOS.

The first method which uses a special character string, is used if the user wants to rotate a part of the text without understanding any printer controls. The user inserts a special character string to start and stop rotating the text. When the rotate print utility intercepts the print data and detects the special character string, it replaces the string with a Set Font Global Control (SFG control) in the print data.

Figure 3:
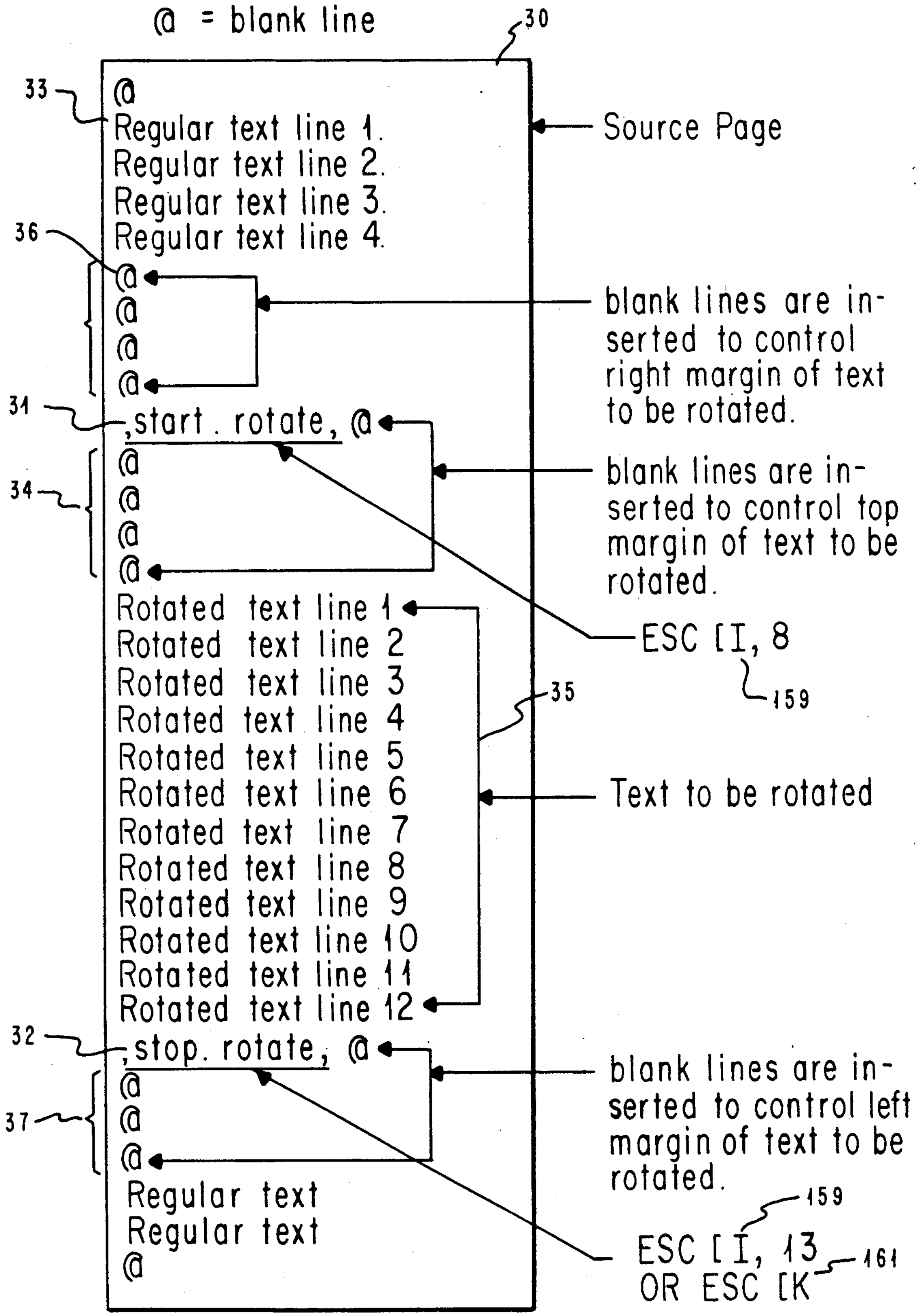
FIG. 3 shows a document with markers to indicate the text to be rotated.

Referring to FIG. 3, text 33 (which may include text, data, or symbols) can be rotated anywhere in a document 30 which is generated by application 14 (FIG. 1) by simply inserting a unique character string 31, 32, known as a marker, in the edited document 30 through an I/0 device 19 (FIG. 1), such as a keyboard or similar input device. The markers 31, 32, as shown in FIG. 3 as ",start.rotate," and ",stop.rotate," respectively, are two of the default parameters 41, 42 in the rotate print utility 10 as shown in the table 40 in FIG. 4. However, any character string may be used to indicate the beginning and ending of the text 35 to be rotated. The user can either use the default strings 41, 42 FIG. 4, or specify the user's own character strings through an option menu 50 as shown in FIG. 5.

The display screen 50 for defining the rotated print marker is shown in FIG. 5. When the "define rotation markers" menu 50 is displayed, the rotate print utility 10 is loaded and active.

Referring to item "a" 51 in FIG. 5, the user specifies a marker 31 of up to 20 characters to start the rotate print function. The user inserts this marker 31 anywhere in the text 33 (FIG. 3). If the marker is on a separate line with no other print characters, a blank line is printed in the rotated mode. The utility prints all text 35 following the specified character string 31 rotated until an end marker 32 is detected to stop the rotated print.

In item "b" 52 (FIG. 5), the user specifies a marker 32 of up to 20 characters to stop the rotate print function. The user inserts this marker 32 anywhere in the text.33. If the marker is on a separate line, a blank line will be printed in the non-rotated mode after the marker. The utility prints all text 33 following the specified character string 32 in a normal fashion, i.e, non-rotated.

Alternatively, two identical markers (one character string) can be specified to start as well as to stop the rotated print. Also, any length of character string may be used, and does not have to be limited to less than twenty characters in other embodiments.

The rotate print utility 10 does not print this character string 31, 32 (FIG. 3) but uses it only as a control. Therefore, if the user prints this document file 30 with the rotate print utility 10 deactivated, this string of characters 31, 32 will be printed as shown in FIG. 3 without the text between the markers 31, 32 being rotated.

The user can print sideways using the rotate print utility 10 (FIG. 1) either directly or from the application program 14 or from DOS 16. The user can save the document file 30 on a diskette 4 or disc file 2, and print the document 30, containing the rotate markers 31, 32, sideways while in DOS using known DOS print commands. To print sideways directly from the application 14, the user can load the application 14 and use the application 14 print commands.

The rotate print utility 10 intercepts all data 3 going to the printer 17 even when the rotation is not required. When rotation is required, the utility 10 buffers, rotates, and modifies the printable data 3 before sending it to the BIOS routine 6 and then to the printer 17.

Upon a print command from the application 14 or operating system 16, the rotate print utility program 10 intercepts the data stream 3 going to the printer 17. The rotate print utility 10 then scans the data stream 3, which represents the text data 33 (FIG. 3) in the document 30, for the unique character string 31 to activate the rotate function. Once it activates the rotate function, the rotate print utility 10 buffers the print data 35 within data stream 3 in random access memory (RAM) 18 up to a single rotated page.

The rotate print utility 10 stores the print data 35 of data stream 3 in the page buffer 18 row by row in a non-rotated sequence. The rotate print utility 10 stores the whole page to be rotated 35 in the memory 18 on a line basis, in the form of a matrix 70, FIG. 7A, 7B. Each memory location (row 1, column 1; to row N column N) represents a single character position on the page 30 (FIG. 3) of the text 35 to be rotated. After the rotate print utility 10 receives an entire page, it sends the print data 35 to the printer. The data is sent in a rotated order to print sideways on the paper.

The rotate print utility 10 rotates the print data 35 by accessing the matrix 70, column by column. For left rotated text 95 (FIG. 9), the last column of matrix 70 is accessed first starting with the top of the column, memory location 73. For right rotated text 115 (FIG. 11) the first column of matrix 70 is accessed first starting with the bottom of the column, memory location 77.

Figure 7A:
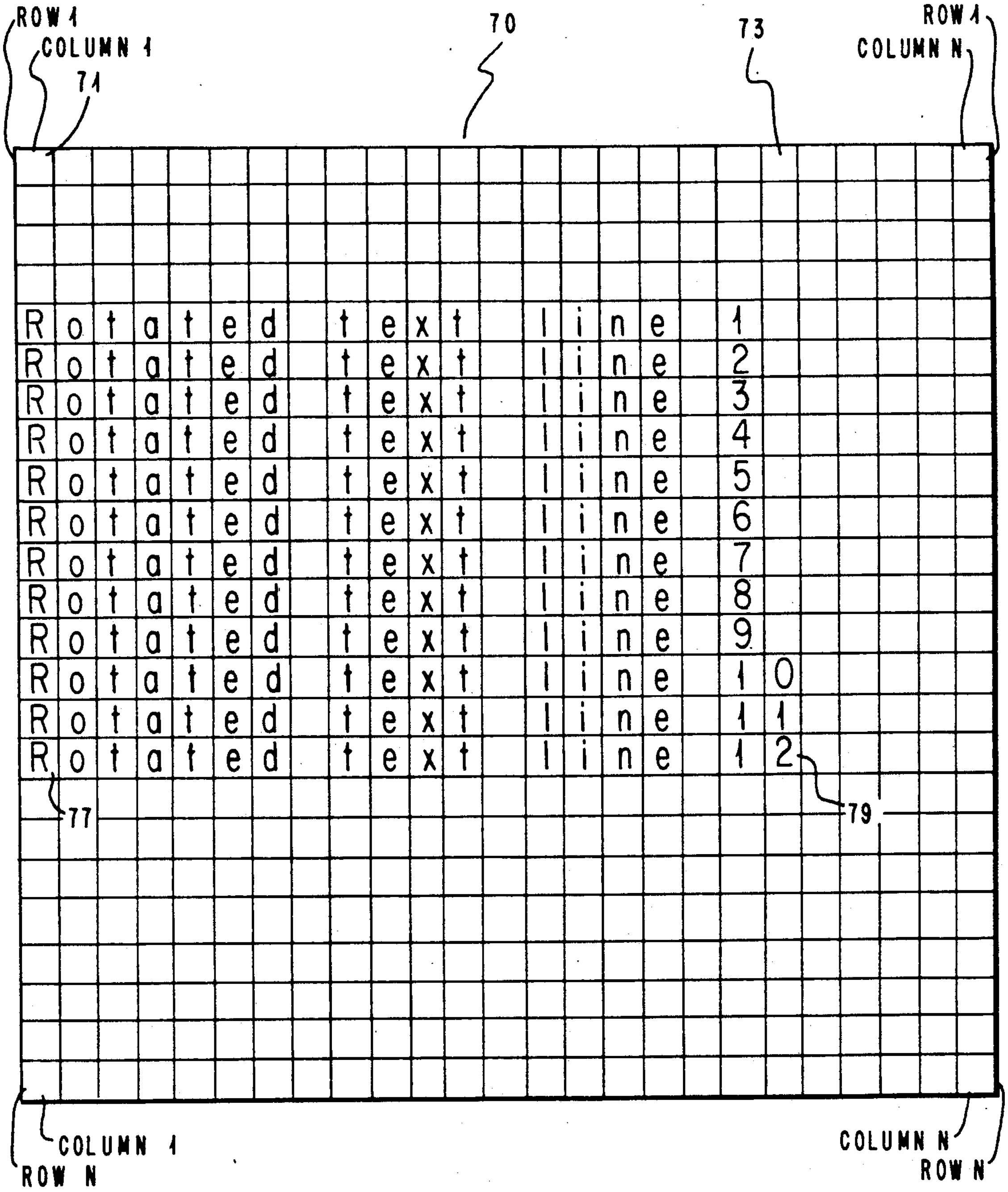
FIG. 7A shows the text to be rotated stored in a page buffer in matrix form.
Figure 12A:
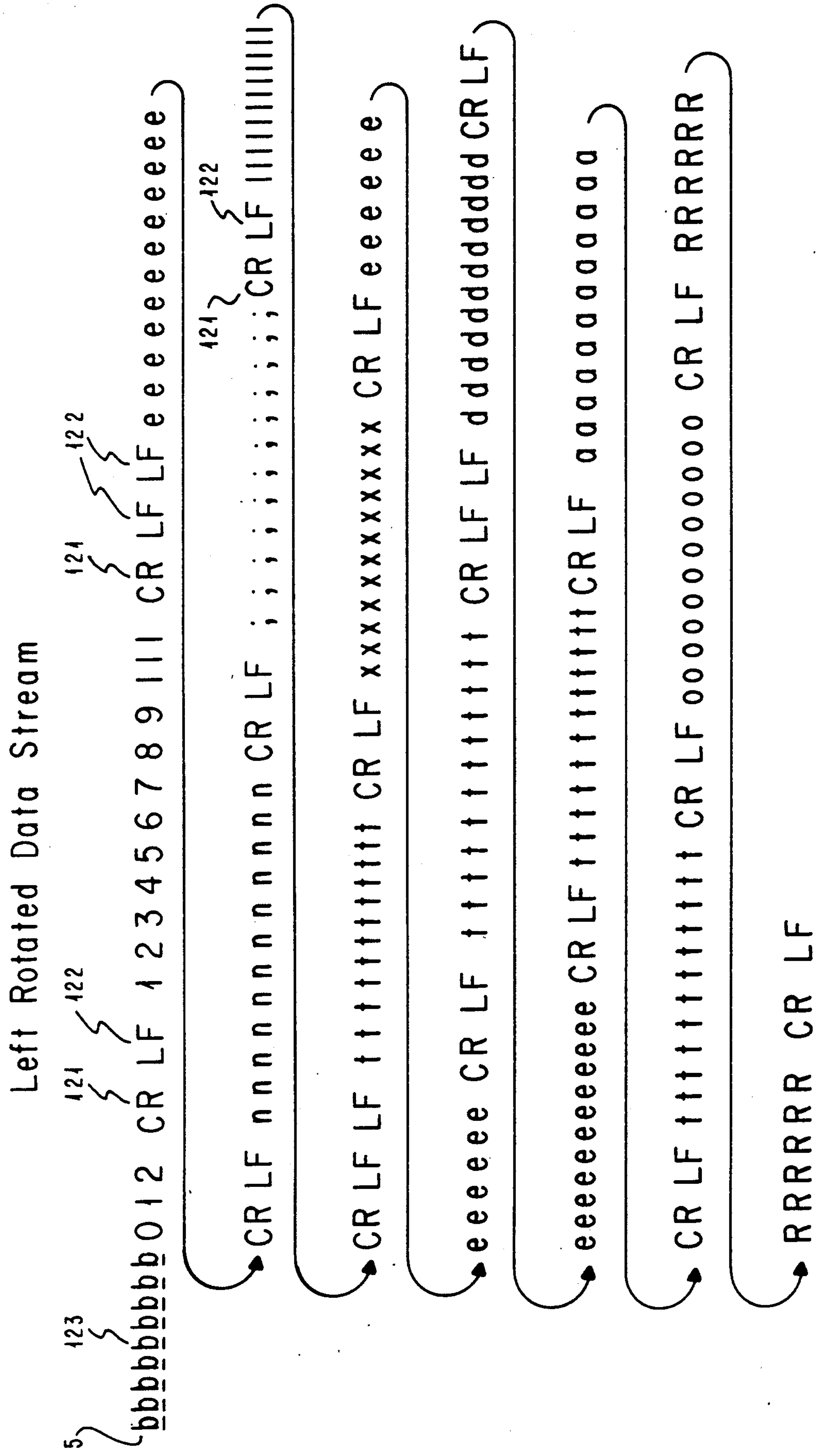
FIG. 12A shows the data stream sequence sent from the matrix buffer to the printer for left rotated text.

To rotate text with a left orientation, the sequence of the data stream that is sent to the printer is changed. This is illustrated in the following figures. FIG. 7A shows the text to be rotated stored in the matrix buffer 70 as the text itself for illustration purposes. FIG. 7B shows the ASCII codes for the text as it actually would be stored in the matrix buffer. For illustration purposes, FIG. 12A shows the data stream sequence 5 of the text to be rotated that is sent to the printer 17. The characters "b" 123 represent blanks, i.e. no characters. The letters "CR" 121 represent a carriage return control, and the letters "LF" 122 represent a line feed control. FIG. 12B shows the data stream sequence 5 in ASCII codes in the order accessed from matrix buffer 70 as shown in FIG. 7B for left rotated text. FIG. 12B only illustrates the changed sequence of the data stream. The data stream 5 also would include necessary printer controls for the necessary printing functions.

The rotate print utility 10 can be programmed such that an automatic carriage return 121 and line feed 122 are inserted in the data stream sequence 5 after each column of the matrix is accessed. Also an automatic line feed 122 can be inserted in the data stream sequence 5 if a whole column is blank. In a preferred embodiment, a printer control to invoke variable line spacing 165 (FIG. 15B) is used instead of the line feed 122 so that the index in rotated text is the same as the escape distance in normal text. Also, the escape distance in the rotated text is equal to the index distance in regular text.

Figure 8:
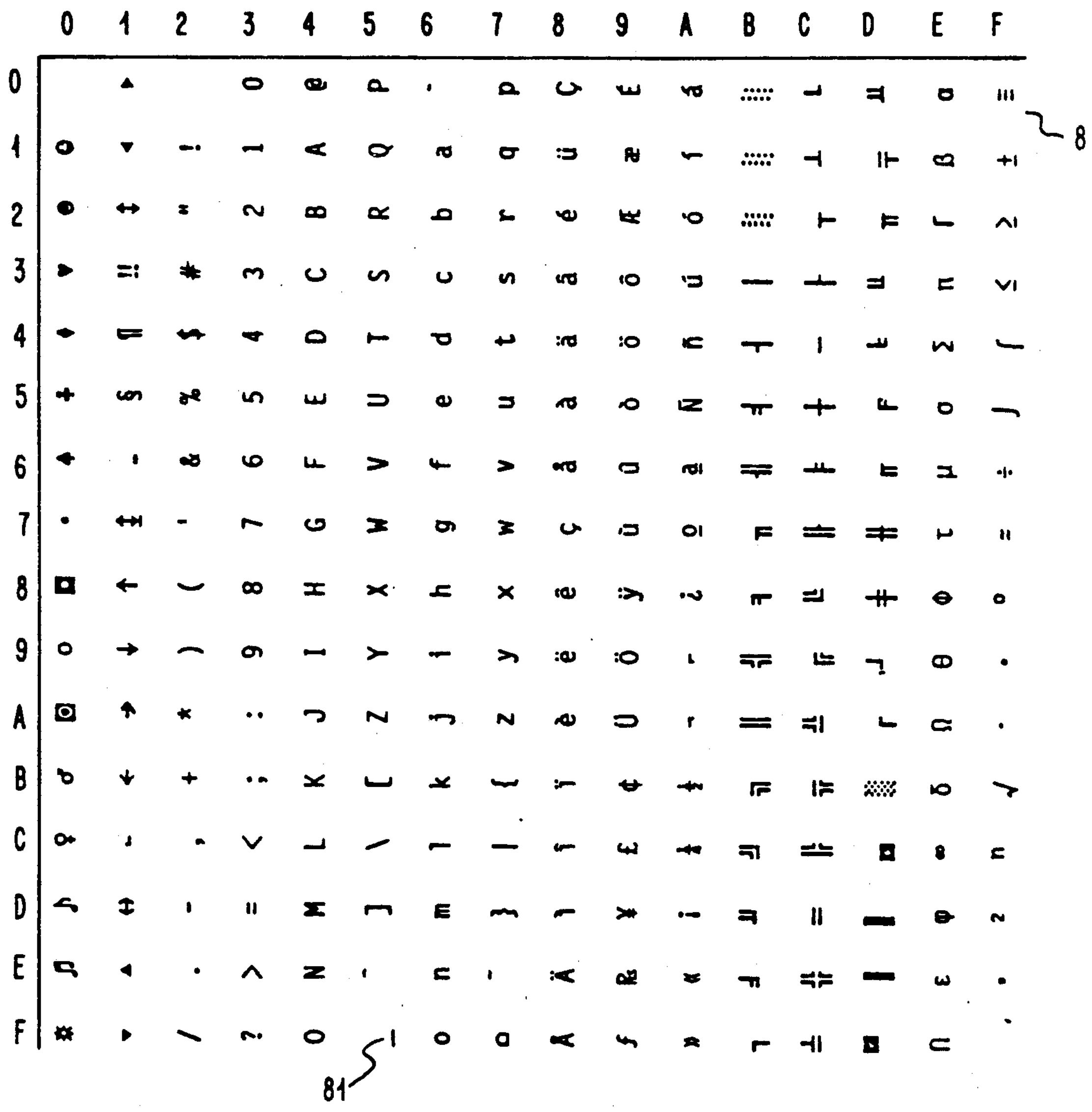
FIG. 8 shows a left rotated character font code page.
Figure 9:
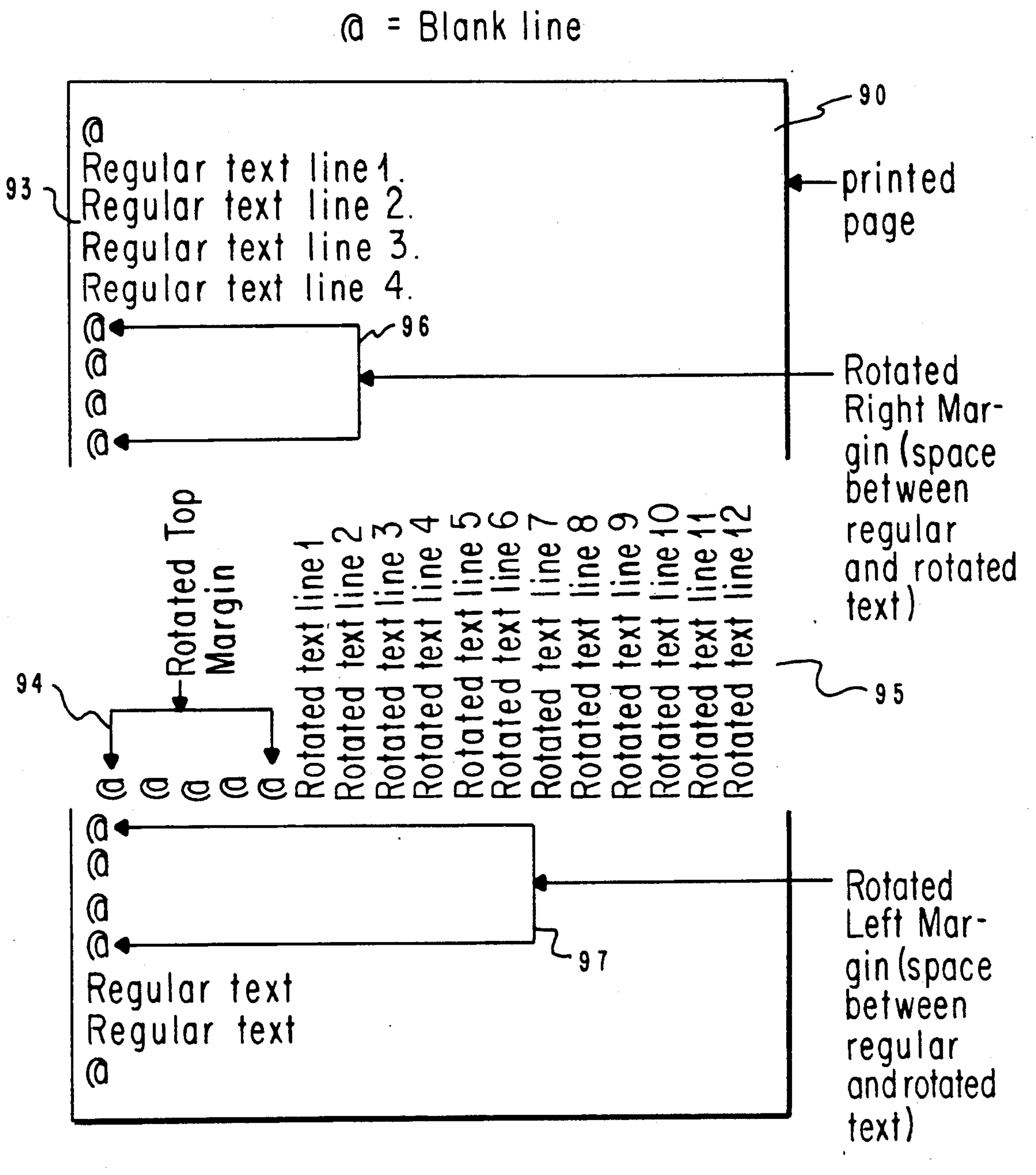
FIG. 9 illustrates the appearance of the printed output of left rotated text in a document.

This new sequence of data, shown in FIG. 12B as the left rotated data stream 5, is then sent to the printer 17 (FIG. 1) to be printed in a normal fashion one row at a time from left to right across and then down the page with a left rotated font 8 as shown in FIG. 8. The resulting left rotated text 95 is shown in FIG. 9.

The rotate print utility 10 also keeps a corresponding attribute byte, also called a status byte, for each character or memory location in the matrix buffer 70. This attribute byte contains the information on how the character is to be printed. The following is a list of the functions accessed in the attribute byte and the respective hexadecimal representation:

Emphasis 45, 46
Underscore 2D
Superscript 53, 54
Subscript 53, 54
Double Wide 57
Backspace 08

To rotate text with a right orientation, the rotate print utility 10 accesses the matrix 70, FIG. 7A, 7B beginning with the last row, of the first column, memory location 77, to the first row of the first column, memory location 71. The rotate print utility 10 then proceeds to the second column beginning with the last row up to the first row. This is repeated until the the rotate print utility 10 accesses through this order the first row of the last column, memory location 73.

Figure 10:
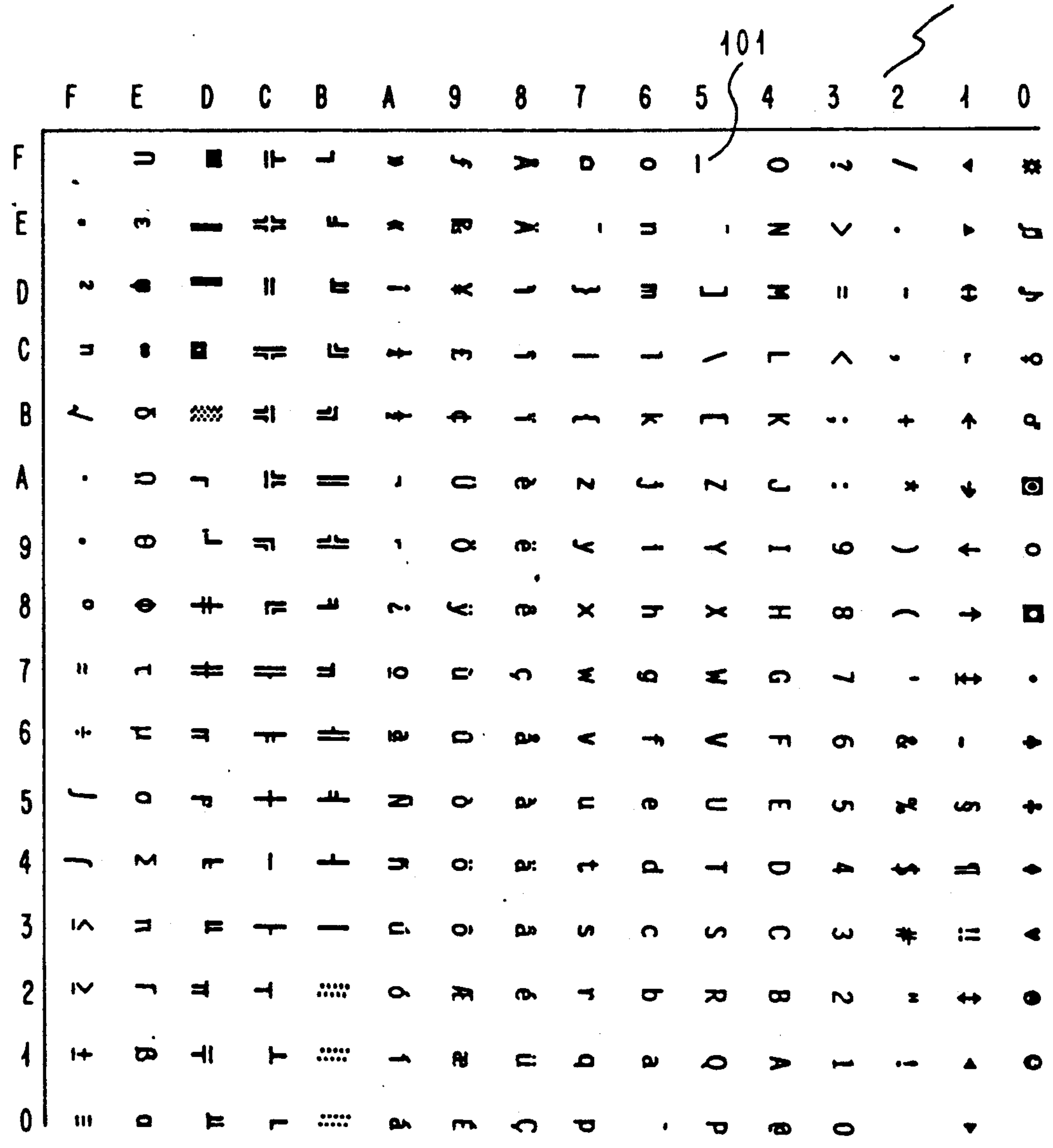
FIG. 10 shows a right rotated character font code page.
Figure 11:
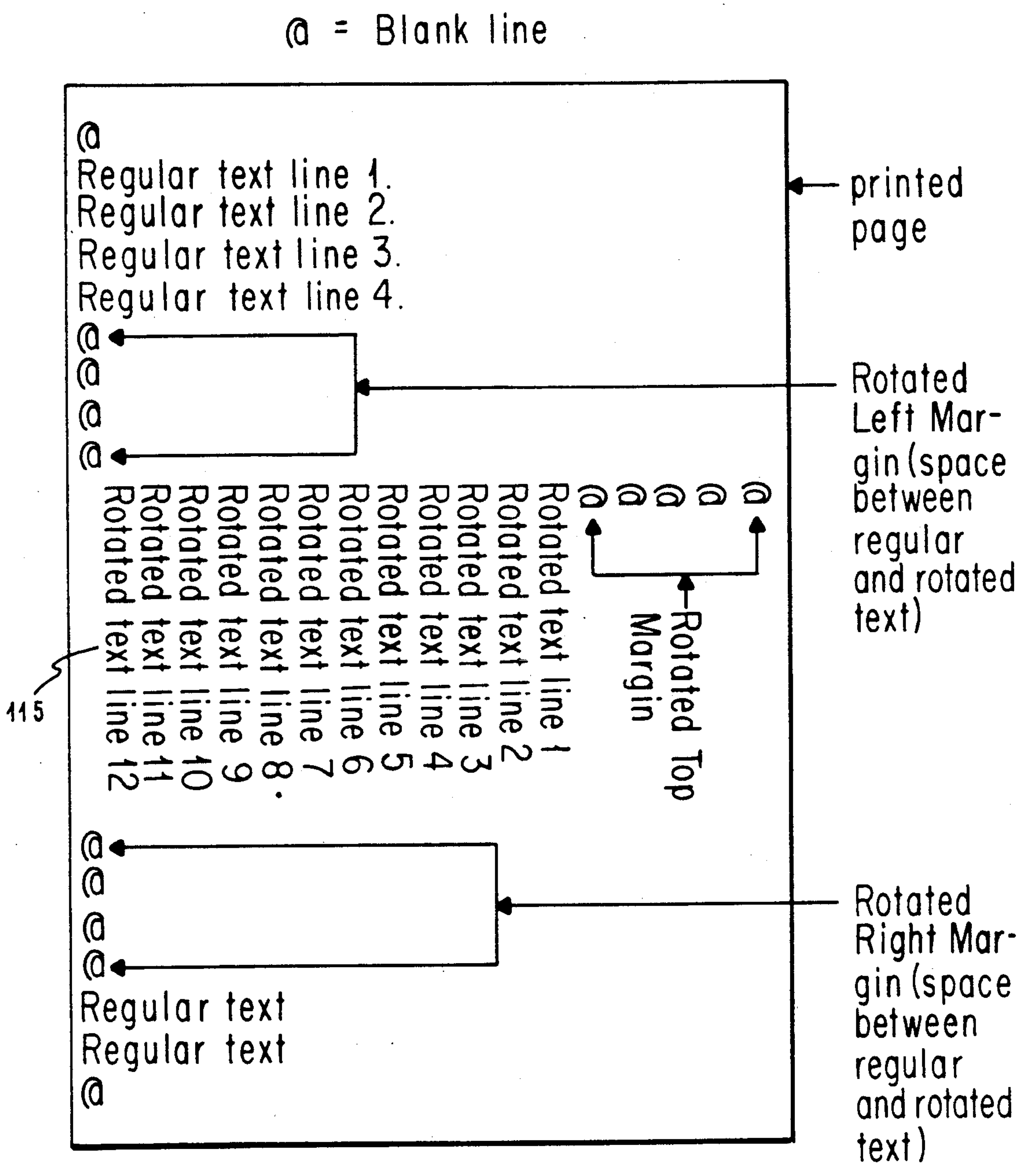
FIG. 11 illustrates the appearance of the printed output of right rotated text in a document.
Figure 13A:
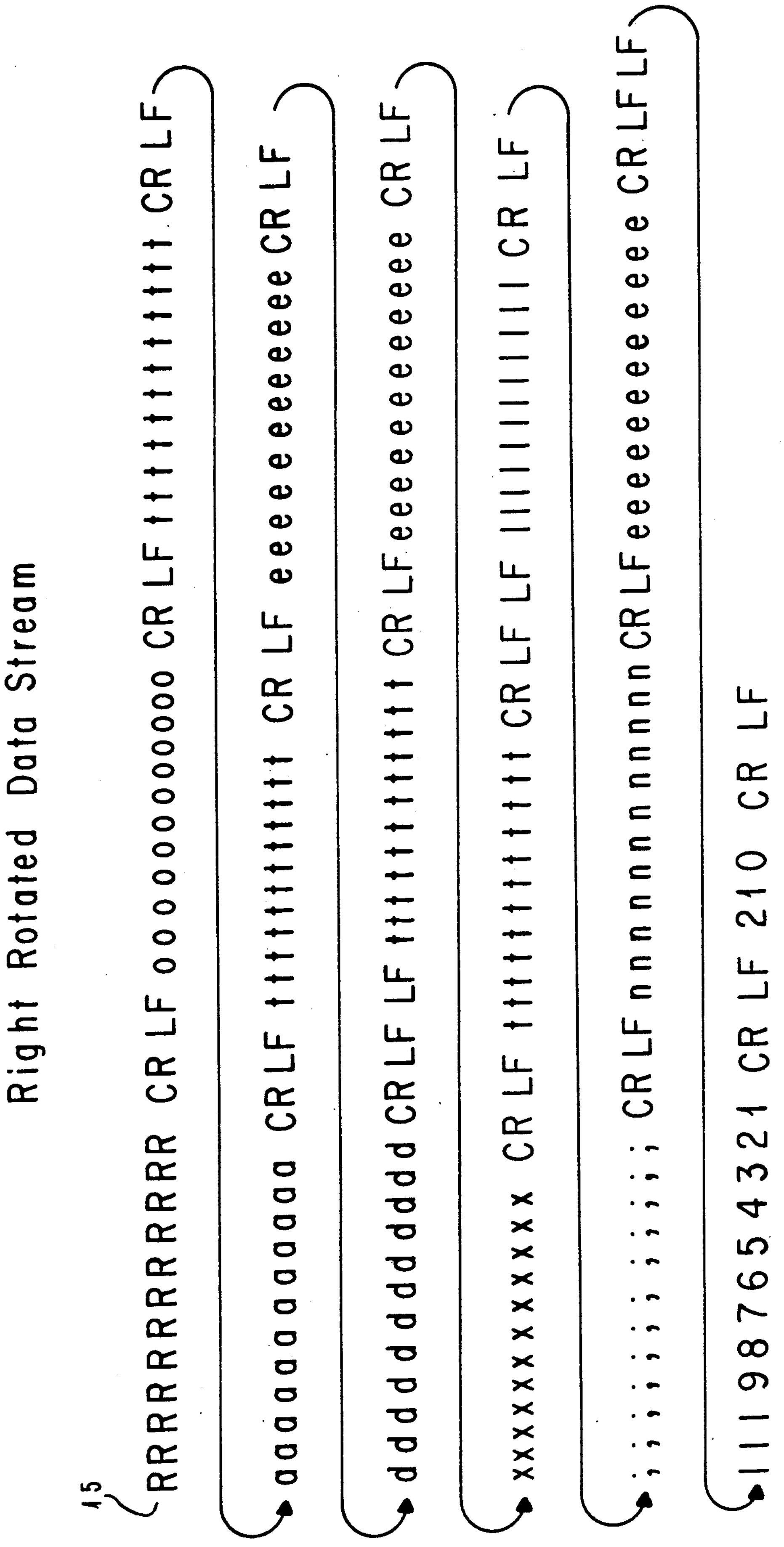
FIG. 13A shows the data steam sequence sent from the matrix buffer to the printer for right rotated text.

This new sequence of data 15, as shown in FIG. 13A, 13B as the right rotated data stream, is then sent to the printer 17 to be printed in a normal fashion one row at a time from left to right across and then down the page with a right rotated font 12 as shown in FIG. 10. The resulting right rotated text 115 is shown in FIG. 11.

Again, the data stream sequence 15 shown in FIG. 13B only illustrates the changed sequence of the data stream. The data stream 15 also would include necessary printer controls for the necessary printing functions. For example, a printer control to invoke variable line spacing 165 (FIG. 15B) would be inserted in place of a line feed so that the index in rotated text is the same as the escape distance in normal text.

Figure 21:
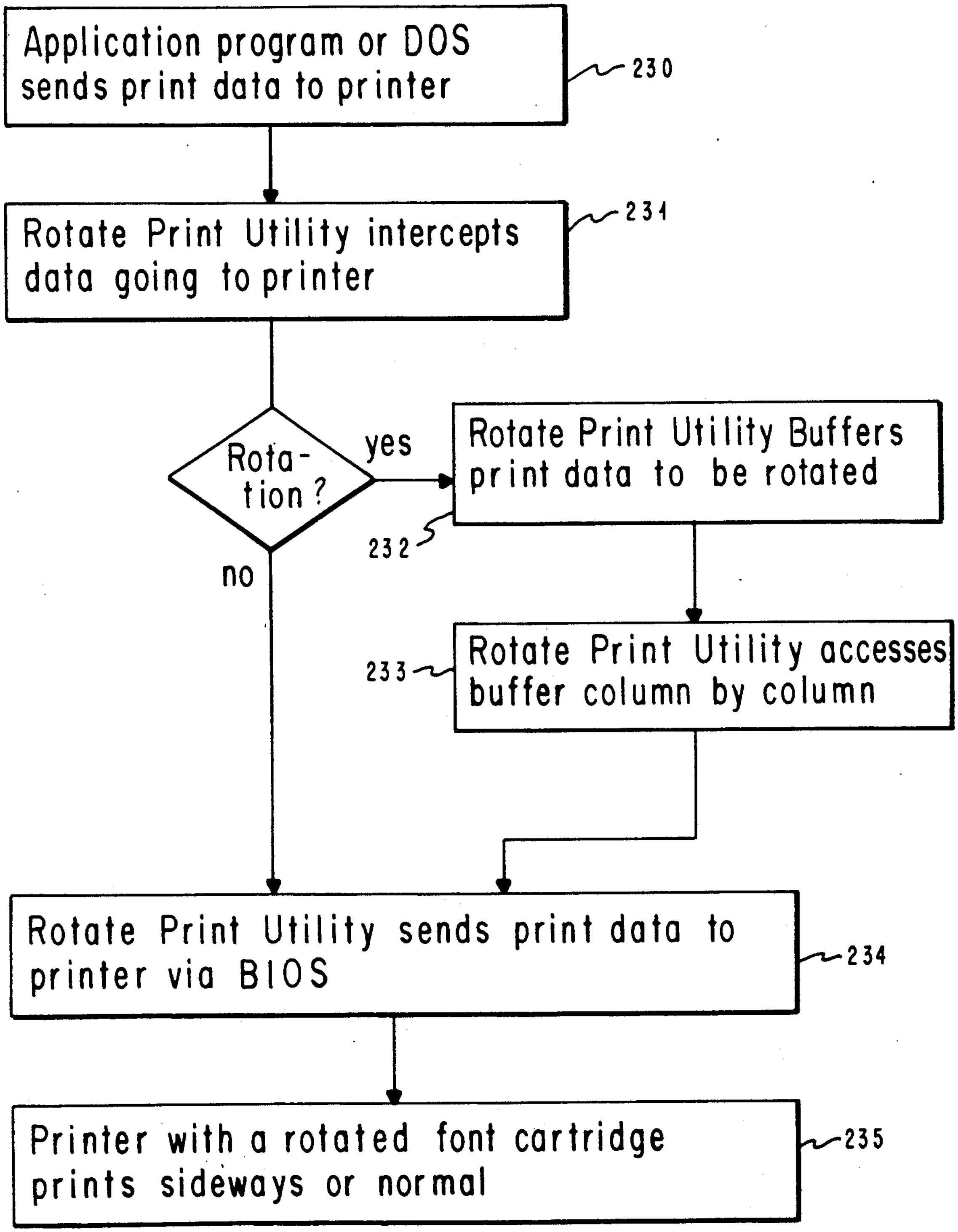
FIG. 21 shows the print data flow diagram.

The above description is summarized in the print data flow diagram in FIG. 21 with reference to FIG. 1. The application program 14 or the operating system 16 sends the print data 30 (FIG. 3), 3 (FIG. 1) to the printer 17, step 230. The rotate print utility 10 intercepts the data 3 going to the printer 17, step 231. If the print data 3 is not to be rotated, the rotate print utility 10 sends the print data 3 to the printer 17 via the BIOS 6, step 234. The printer 17 prints the data 3 with a normal font cartridge 13, step 235. If the print data 3 is to be rotated, then before the rotate print utility 10 sends the print data to the printer 17, step 234, the rotate print utility 10 buffers the print data 3 that has been selecte˙ to be rotated, step 232. The rotate print utility 10 accesses the buffer 18 column by column, step 233, in order to change the sequence of the print data 3. The rotate print utility 10 sends the changed sequenced print data 5, 15 to the printer 17 via BIOS 6, step 234. The printer 17 prints the data 5, 15 sideways with a rotated font 8, 12, step 235.

When the rotate print utility 10 (FIG. 1) intercepts the print data stream 3 and detects the special character string 31, 32 (FIG. 3) it replaces the string with a Set Font Global Control (SFG control) 159 (FIG. 15B) in the print data stream 3. The rotate print utility 10 issues the Set Font Global (SFG) escape control 159 to the printer 17 to tell the printer 17 to change the font 8, 12, 13. Any additional SFG controls to change the font 8, 12, 13 already present in the print file 30 will result in ambiguous printing.

Referring to FIG. 3, the second method which directly uses the SFG control in the print data 30 is used when the user does not want to insert any extra character strings 31, 32 in the text 33 to print sideways. The user can use this method only if the application program 14 allows inserting escape controls (FIG. 15B) in the print file 30. Rotated and non-rotated (normal) printing can be intermixed.

The user inserts the SFG control (ESC [I) 159 with a proper font identification 8, 12, 13 to start and stop rotating the text 35. To start rotating, the user uses the font identification 8, 12 specified in the option menu 60 FIG. 6. To stop rotating, the user uses the font identification which selects the original (or other non-rotated) font 13.

The Set Initial Conditions (ESC [K) control 161 (FIG. 15B) also terminates the rotation of the text 35. The rotate print utility 10 ignores all other change font 151 (FIG. 15B), change pitch 152, 153 and change code page controls 154 when the rotate function is active.

The user prints directly from the application program 14 or creates a print file 30 containing SFG controls 159, and then prints when in DOS 16 using the normal DOS print commands.

The user can directly insert the SFG control 159 in the print file 30 in this second method.. If inserting the control 159 is not possible with a specific application 14, the user can select either method 1 or 3. In these other methods, the rotate print utility 10 automatically inserts the SFG control 159 in the print data stream 3 for the user. Based on the user's knowledge and desire to control the rotated output, the user chooses the appropriate method to activate the rotate function.

The third method, which uses a special command in DOS, is used when an entire print file 30 is to be printed sideways. No markers 31, 32 or escape controls 159, 161 are necessary inside the print file 30. Therefore there is no need to modify the existing print file 30. When in DOS 16, the user asserts the following command to print an entire file 30 rotated. The rotate print utility 10 must be active before typing the command:

```
>RPU [drive]:[/][path][/]filename[.extension]
```

The items in brackets ([]) are optional. For the drive and the directory path name, the same defaults are used as in the DOS command.

This third method allows the user to print sideways without the need to modify an existing print file 30. The rotate print utility program 10 automatically inserts an appropriate SFG control 159, 161 in the beginning to start and at the end to stop rotation.

To print sideways in any of the above three methods, the user plugs a cartridge with the rotated font 8, 12 in the printer 17. It can be either a ROS font cartridge or a font download cartridge. The rotate print utility 10 selects the rotated font 8, 12 in the printer 17 before starting the sideways printing. It issues normal ASCII character codes to the printer 17, and the rotated font 8, 12 produces the sideways printing. This scheme saves processing and printing time and permits letter quality printing using fully formed characters as opposed to dot formed characters.

For all of the three methods above, the rotate print utility 10 always monitors the printer controls (FIG. 15A, 15B) going to the printer 17, if the rotate print utility 10 is active. This is true even when rotation is not required. The printer controls (FIG. 15A, 15B) typically control the format of the printed page such as character pitch 152, 153, line spacing 155, maximum lines per page, 154 etc. The printer controls (FIG. 15A, 15B) that control the format of the printed page are referred also as the setup information.

The rotate print utility 10 stores the normal (non-rotated) print page format parameters such as margins, tabs, line spacing, lines/page and pitch. When the rotate print utility 10 activates the rotate. print function, the rotate print utility 10 sends a new set of printer controls 40 (FIG. 4) to the printer to reset all the normal formatting parameters in the printer 17 before starting sideways printing. The rotate print utility 10 sets the different values just for the sideways printing. This is necessary due to the different interpretation of the formatting parameters for the sideways printing. The user must insert all printer controls for the sideways printing following the start rotate marker 31 (FIG. 3) so the rotate print utility 10 can use these controls to set the formatting parameters for the rotated page. The rotate print utility 10 keeps the status of the print controls associated with the stored rotated page 35 in a separate buffer. The rotate print utility 10 reactivates the original normal parameters when it resumes the normal printing.

After the user activates the rotate function, the utility 10 handles the printer controls in five different ways:

1. Passes the controls directly to the printer as they are received.
2. Emulates the controls, and then sends them to the printer at the appropriate time.
3. Ignores some controls which are never sent to the printer.
4. Emulates the controls but does not send them to the printer.

Normally, the rotate print utility 10 uses default values 40 for formatting the rotated page as given in FIG. 4. The user can change these default values 40 either by issuing proper print controls 150 (FIG. 15A, 15B) or by using option menu 60, FIG. 6. The user gets option menu 60 FIG. 6 by selecting item "a" 141 in main option menu 140, FIG. 14. To get the main option menu 140, FIG. 14 on the screen, the user types "rpu /o" when in DOS. After changing the values 61–68 in option menu 60, the new values stay in effect until the rotate print utility 10 is deactivated. To make the change permanent, the user saves the new formatting values 61–68 on a disc 2 (FIG. 1) by selecting a proper option "f" 146 in the main menu 140, FIG. 14.

Referring to FIG. 14, option "a" 141 is used when the format of the rotated page 35 (FIG. 3) or the rotated font 8, 12 are different than available by the default parameters 40 FIG. 4. The following items (formatting parameters or font description) can be changed by selecting item "a" 141 (FIG. 14) to get option menu 60, FIG. 6:

rotation of the text 61
character pitch 62
line spacing 63
longest line 64
maximum lines/page 65
paper size 66
rotated font id 68

Referring to option menu 60, FIG. 6, a description of the options is as follows.

Referring to option "a" 61, character rotation is shown as illustrated in FIG. 2. The character rotation left 21 means that the copy has to be rotated to the right before a person reads it. Character rotation right 22 means that the copy has to be rotated to the left before it can be read. Another way to explain this is to consider the following. Normal text reads in the direction left to right. With character rotation left, text reads in the direction bottom to top. With character rotation right, text reads in the direction top to bottom.

With character rotation option "a" 61, the user defines the character rotation direction. It is important that the proper font cartridge 8, 12 is selected in option "h" 68 to match what has been selected in option "a" 61.

In the character spacing option "b" 62, the user selects either 10, 12 or 17.1 pitch.

In line spacing option "c" 63, the user selects the line spacing.

In option "d" 64, the user defines the longest line length (on the rotated page) in terms of characters/line. In option "e" 65 the user defines the maximum lines per page. The rotate print utility 10 automatically inserts a line ending code if the line is longer than specified. The default is 128 characters. Also, it inserts a form feed if the page is longer than specified. The default is 48 lines.

Based on the characters per line option "d" 64 and the lines per page option "e" 65, the space for the rotated page buffer 70 is reserved in the system 7. The rotate print utility 10 requires about 8K of program memory plus some memory 18 to buffer the print data 30. The size of the page buffer 18 occupied by the rotate print utility 10 depends on characters/line and lines/page. The size of the buffer memory in bytes equals characters/line times lines/page times 2. The amount of the buffer memory depends on the maximum size of the rotated print line. A normal buffer size is 13K for the line size of 130 characters and 50 lines per page. For 255 characters/line with the same lines/page the buffer size is 25.5K.

On a single page as shown in FIG. 17, the user can print header 171 and footer 172 non-rotated (straight) and the rest of the text 173 rotated. The user can also print an entire page 180 (FIG. 18) (header 181, footer 182 and text 183) rotated. However, to print an entire page 180 rotated, the user must be able to specify a separate header/footer using an alternate format for the rotated page. Based on the location of the rotation markers 31, 32, the rotate print utility 10 prints the header and footer either straight or rotated.

If the user places the start rotate 31 marker at the beginning of the header defined in the alternate format for the rotated page, the utility 10 prints the header rotated.

If the user places the start-rotate marker 31 at the top of the text, the rotate print utility 10 prints the header straight (non-rotated).

If the user places the stop rotate marker 32 at the end of the text, the utility 10 prints the footer straight (non-rotated).

If the user places the stop rotate marker 32 at the end of the footer defined in the alternate format for the rotated page, the utility 10 prints the footer rotated.

When printing header/footer straight and text rotated, the rotated maximum line length should not exceed the space available for the text between header and footer. Since rotated text may not occupy the same printing space as normal text, the user may have to make some adjustment in the rotated text margins in order to print the footer at the desired location on the page. In option "f" 66 FIG. 6, the user defines the page size.

Since it is difficult to center the rotated text on a page, the rotate print utility 10 provides automatic centering of the rotated text. Automatic centering 47 (FIG. 4) is the default condition. Based on the pitch 56, maximum line length 44, and lines per page 45, the rotate print utility 10 calculates the size of the rotated text. With known page size option "f" 66 (FIG. 6) as selected by the user, it then adds additional space in the rotated text to be able to print the rotated text at the center of the page. For the inexperienced user, this option is very useful. For the experienced user, this automatic centering 47 option (FIG. 4) can be turned off. The user can turn off automatic centering 47 using option "g" 67 (FIG. 6). This option is useful when rotated and non-rotated text is mixed within a page, or the user wants to align the text using printer controls. All printer controls are handled before centering of the rotated text is performed. Ideally, the automatic centering option will be turned off when the rotated text has printer controls for margins etc., or the user is mixing rotated and normal text inside the page boundary.

Normal printer controls for margins are supported by the rotate print utility. However, for the rotated text, these margins are not relative to the edge of the paper like in the normal (non-rotated) print. Therefore, these controls are not useful unless indentation is used in the rotated text.

There is another way of controlling the margins of the rotated text without the printer controls. The user must turn off automatic centering 67 (FIG. 6) of the text when using this technique. The user controls rotated text margins 94, 96, 97 (FIG. 9) by inserting blank lines 34, 36, 37 (FIG. 3) before and after rotation markers 31, 32 as shown in FIG. 3. FIG. 9 shows the printed result.

Referring to FIGS. 3 and 9 simultaneously, an example is shown for setting margins for left rotated text. Right margins 96 and left margins 97 (space between rotated text 95 and non-rotated text 93) and top margin 94 (distance from left edge of the paper) can be set by inserting the proper number of blank lines before and after the rotation markers. Blank lines 36 before the start rotation marker 31 sets the right margin 96. Blank lines 34 after the start rotation marker 31 sets the top margin 94. Blank lines 37 after the stop rotation marker 32 sets the left margin 97.

The following is a summary table for the margins controlled in left and right rotated text.

| Blank Lines | Marker | Left Rotated | Right Rotated |
|---|---|---|---|
| Before | Start | Right Margin | Left Margin |
| After | Start | Top Margin | Not Used |
| Before | Stop | Not Used | Bottom Margin |
| After | Stop | Left Margin | Right Margin |

The space created by a blank line depends on the line densities in normal and rotated mode. The space created by the blank lines before the start marker and after the stop marker depends on the line density in the normal mode. The space created by the blank lines after the start rotate marker and before the stop marker depends on the line density in the rotated mode.

The rotated print utility 10 can not directly issue some of the printer controls 150 to achieve the desired printing results. Therefore to support some special printing modes, the rotate print utility 10 applies unique techniques. The final printed output resembles the output from normal printing.

Figure 22A:
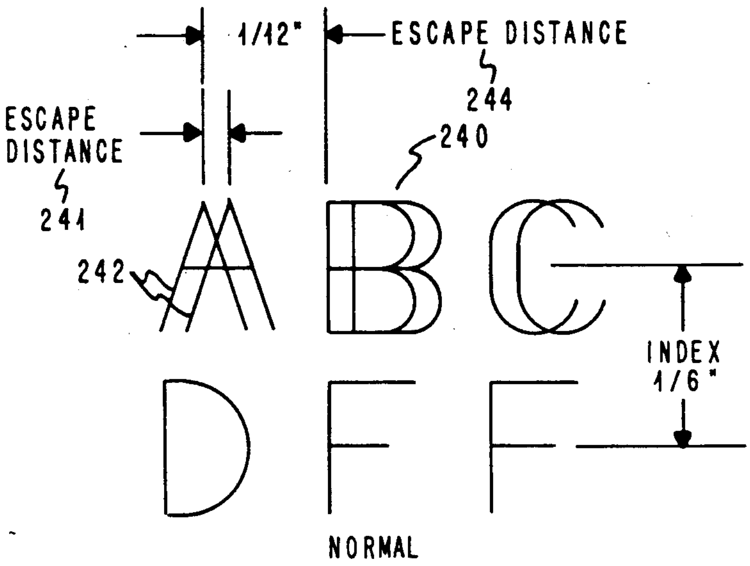
FIG. 22A illustrates emphasis mode in normal text.
Figure 22B:
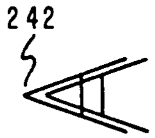
FIG. 22B shows the problem of emphasis mode in rotated text.

For emphasize mode in rotated printing, the rotated print utility can not use the normal emphasize mode 240 FIG. 22A technique which prints the same characters 242 at a predetermined escape distance 241 apart from each other, i.e. 1/120th inch. The double image shifts vertically as shown by the character "A" 242 in FIG. 22B in rotated printing instead of horizontally as in normal printing. To support this mode, the utility 10 performs the following sequence of operations which assumes, for description purposes only, the rotated direction is left.

Figure 22C:
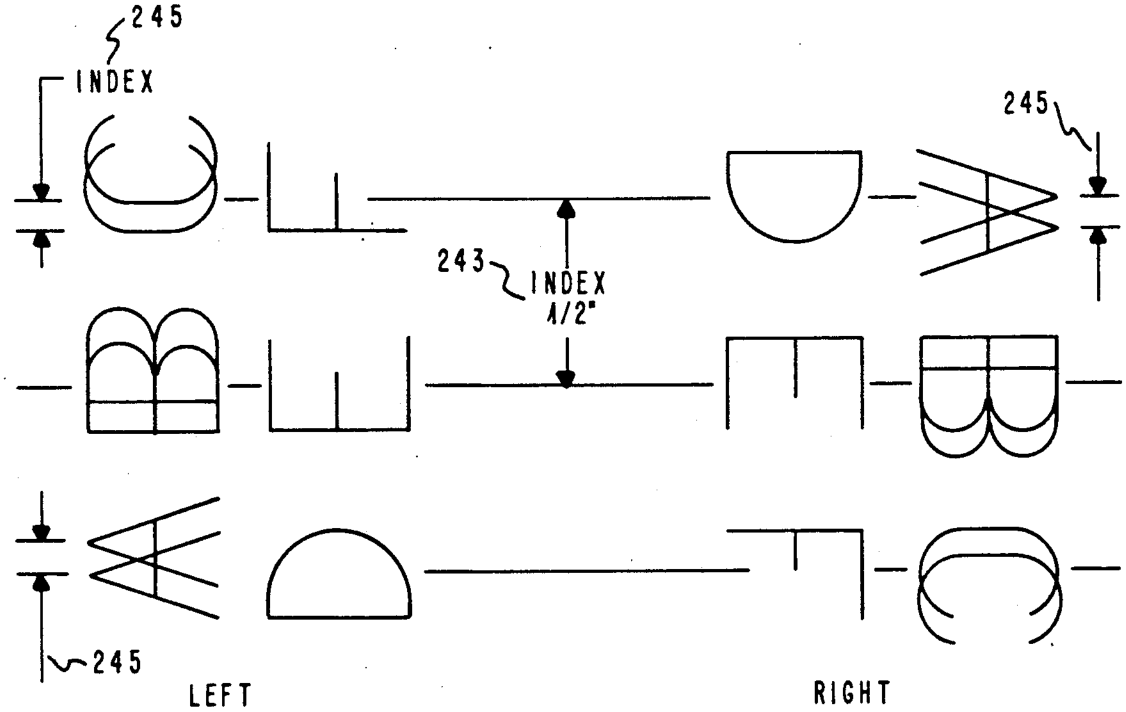
FIG. 22C illustrates emphasis mode in left and right rotated text.
Figure 22D:
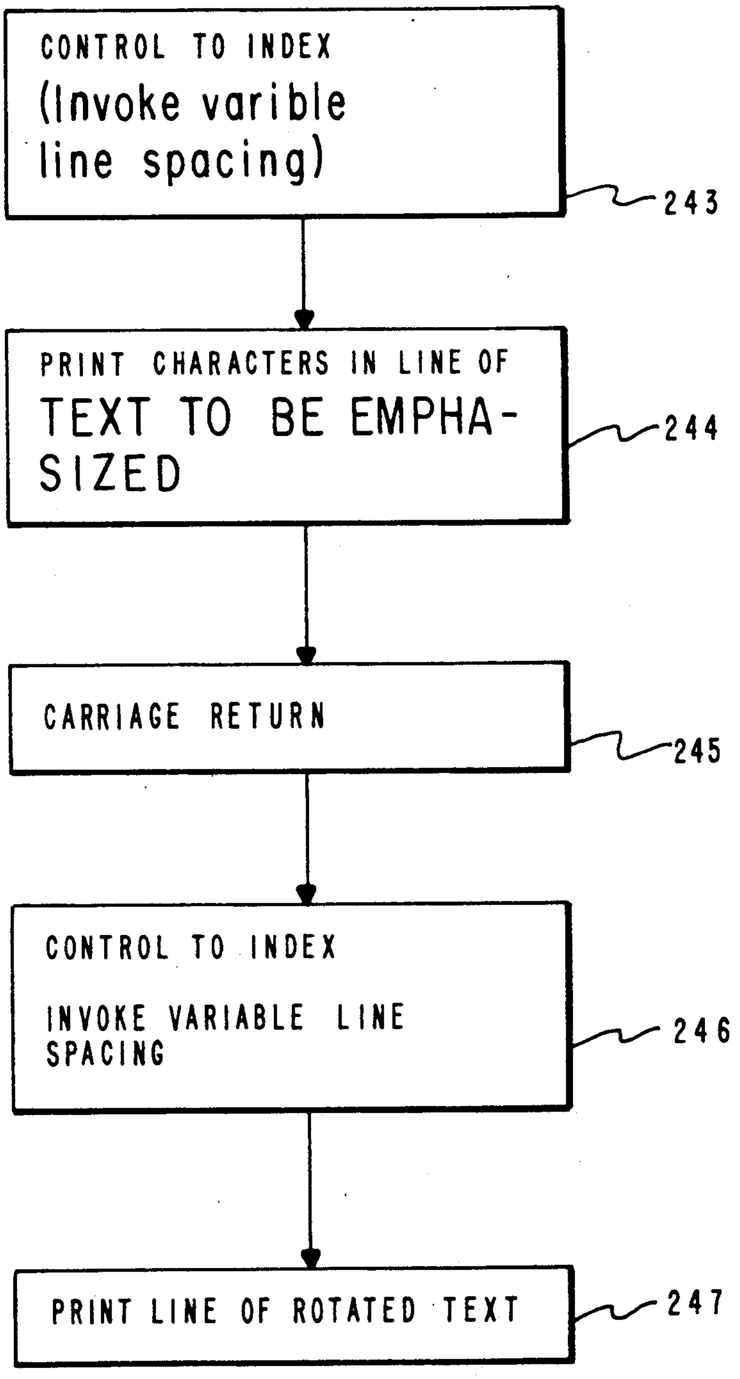
FIG. 22D shows the steps of emphasis mode in rotated text.

First, a control to index such as an invoke variable line spacing 165 (FIG. 15B) is issued step 243 FIG. 22D. The invoke variable line spacing 165 is set at 1/12 inch in a preferred embodiment by the set variable line spacing control 162. Then the index 243, FIG. 22C, in rotated text will be the same as the escape distance 244 in FIG. 22A of normal text. If it is not the first printing line of emphasis text, i.e., the previous line had an emphasis characters the variable line spacing would be set at 9/120 inch. Second, all characters to be emphasized are printed at proper location, step 244. Third a carriage return control 164 (FIG. 15A) is issued, step 245 without a control to index. Fourth, a control to index 1/120" forward (down) is issued through the invoke variable line spacing control 165 (FIG. 15B), step 246. The set variable line spacing control 162 is reset at 1/120 inch in a preferred embodiment. This allows the index 245, FIG. 22C, for rotated text to be the same as the escape distance 241 in FIG. 22A for normal text. Fifth, the line of text is printed, step 247. With these five steps, the rotate print utility simulates the normal print emphasis technique for the rotated printing.

For a right rotated font, the rotate print utility executes the same steps backwards starting from the last step 247 to step 244.

To underscore, the rotate print utility 10 issues the begin underscore control 156 to the printer 17. The printer prints an underscore, vertical bar 81 FIG. 8 for left rotated text and 101 FIG. 10 for right rotated text, simultaneously with each character. The utility issues the begin/end underscore control 156 on a single character basis. No escapements with the underscore function occur. If a blank space is to be underscored, the underscore character 166 FIG. 16 is sent rather than using the egin underscore control.

The rotate print utility 10 also supports superscript and subscript. The rotate print utility does not use the normal superscript/subscript controls 157, 158 (FIG. 15B). Instead, the rotate print utility prints these characters 252, 253 (FIG. 23) by executing a half index 251 (FIG. 23) and printing the characters 252, 253 at the appropriate place at ½ escape distance 254. The rotated superscript /subscript characters are printed at the same relative position as done in the normal printing.

For a partial index, the rotate print utility prints the partially indexed characters at ½ the normal escape distance and also indexes the appropriate amount. The rotated partially indexed characters printed at the same relative position as the normal partially indexed characters.

Figure 23:
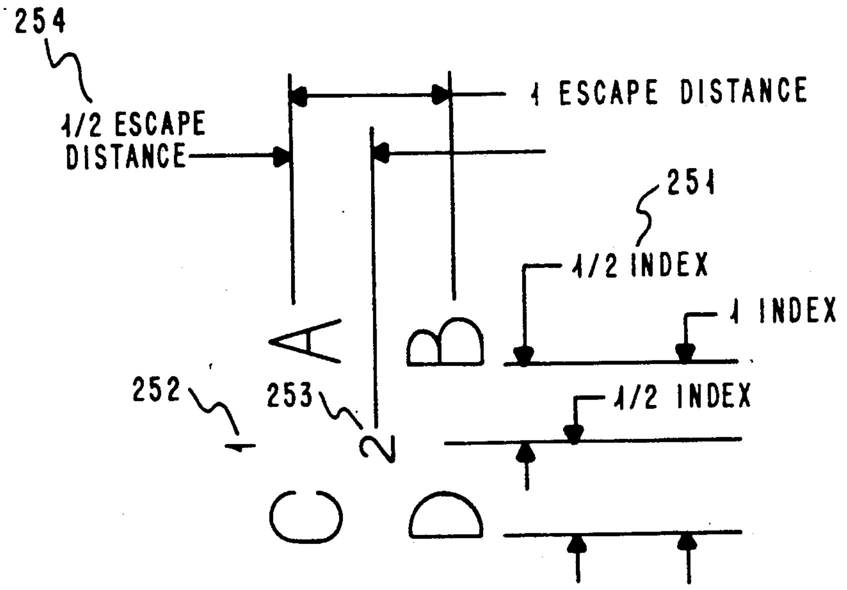
FIG. 23 illustrates the method of printing superscripts and subscripts in rotated text.

As shown in FIG. 23, the printer prints the characters "A" then "B", issues a carriage return and a partial index, then prints a rotated "1" and "2" at ½ the escape distance. A carriage return and a partial index is issued, and the printer prints a rotated "C" and a rotated "D".

For a backspace, the rotate print utility handles the backspace control by doing a double pass on a line having the backspace control. This is done to perform the double strike printing. The rotate print utility can handle the multiple backspaces.

The other available options on the main option menu 140, FIG. 14 are as follows. Option "b" 142 is invoked when different rotation markers 31, 32 are used than the default rotation markers 41, 42. Option "c" 143 is used when the user wants to download the rotated print font. The font download type cartridge must be plugged into the printer before downloading the rotated font. The default printer port for rotated printing is LPT1. Other than the LPT1 port can be selected using option "d" 144. Option "e" 145 is used if an automatic line feed has to be inserted after a carriage return, or an automatic carriage return has to be inserted after the line feed.

All of the above changes made in the option menus 50, 60 are only effective for the present session of the rotate print utility driver or until the rotate utility 10 is deactivated. Option "f" 146 is used to store the changes permanently on a disc 2 (FIG. 1). Option "z" is used to return to DOS 16.

Figure 19:
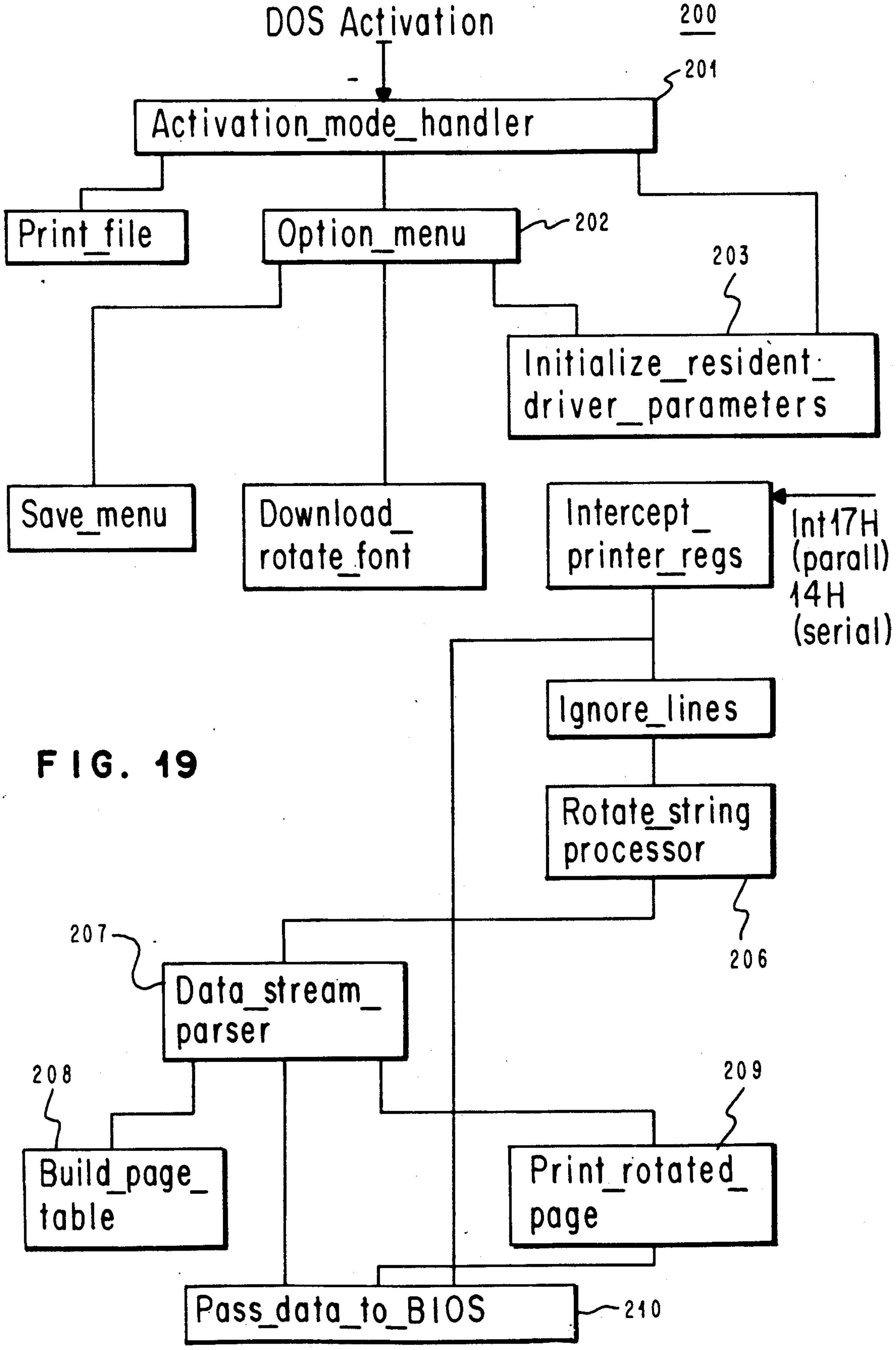
FIG. 19 is a system call structure diagram.

FIG. 19 shows the system level call structure 200 for the rotated print utility program 10. When the user initiates an option from option menus 50 (FIG. 5), 60 (FIG. 6) of the utility 10, the Activation_mode_handler subsystem 201 decodes the parameters. When the Activation_mode_handler 201 detects the "/o" parameter, it passes the control to the Option_menu subsystem 202. The Option menu 202 displays the main menu 140 (FIG. 14). The user changes and sometimes saves the parameters on the diskette. The subsystem Initialize_resident_driver_parameters 203 decodes the user specified parameters and sets the state of the rotated print utility.

The rotate_string_processor 206 looks for the start/-stop rotated markers 31, 32.

The data_stream_parser 207 remembers the state of the printer 17 when processing non-rotated data. It translates characters or code into values in the "Build_page_table 208 when processing rotated data. The Build_page_table 208 builds the table containing a page of the rotated print data a single byte at a time. It saves an attribute byte for each printable character and the information about line spacing and margins for each line. Once the print_rotated_page 209 subsystem completes the page, it then passes the data to the printer via BIOS 6 (FIG. 1), step 210. It also inserts the special print controls depending on the character attribute byte.

Figure 20:
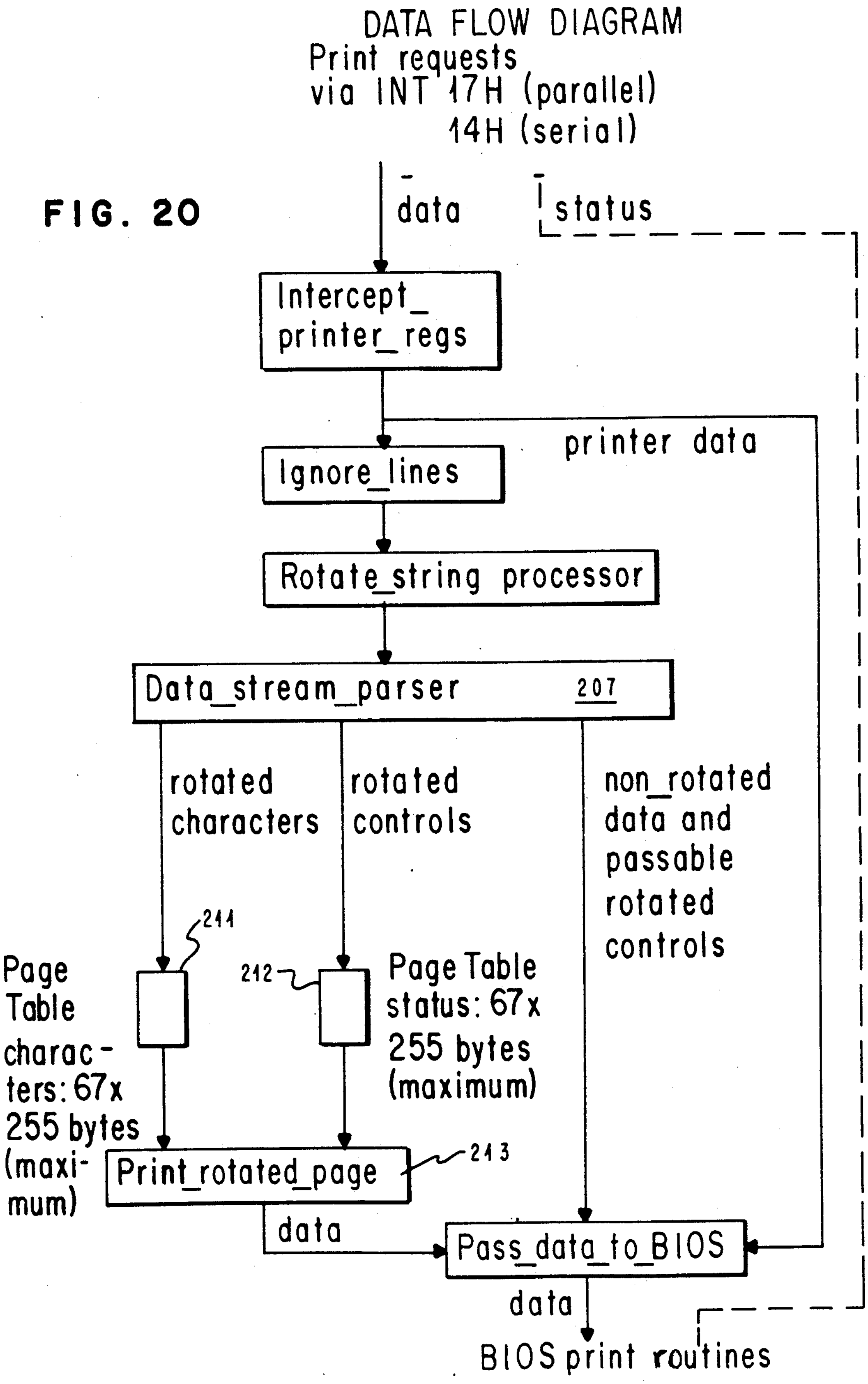
FIG. 20 is a data flow diagram.

The data flow diagram is shown in FIG. 20. There are two different sources of inputs of printing data. From the existing print file when method 3 is used, or directly from the application program 14 (FIG. 1). If the rotate print function is not active, then the utility directly passes the non-rotated data to the printer 17. Even after the user activates the rotated print the utility still passes some controls directly to the printer.

The data_stream_parser 207 separates the rotated print data 211 and the rotated print controls 212. The data_stream_parser 207 stores printable character and associate status in a buffer called page_table 211, 212.

The print_rotated_page 213 subsystem pulls out the data from the page_table 211, 212. It then sends appropriate characters and controls to the printer to enable it to print sideways.

Although the foregoing invention has been particularly shown and described with reference to the preferred embodiments thereof, it will be understood by those skilled in the art that other changes in form may be made without departing from the spirit and scope of the invention.

We claim:

1. A system for controlling the presentation of a text document, represented by a data stream having a specific sequence, to a printer from a processing system, said system comprising:

a first font, electronically representative of a first orientation of characters, said first font being resident in said printer;

a second font, electronically representative of a second orientation of characters, said second font being resident in said printer;

means, in said processing system, for inserting, by a user, a marker into said text document for designating a selected portion of said text document;

means, in said processing system, for scanning said data stream for said inserted marker;

means, in response to said scanned inserted marker, for changing in said processing system the specific sequence of the data stream representing said designated portion of text, thereby electronically rearranging that portion of said data stream corresponding to said selected portion of said text document; and means for intermixing said first orientation of characters and said second orientation of characters independently within a page boundary of said text document by printing said rearranged sequence of said data stream of said selected portion of text with said second font, and printing an unchanged sequence of said data stream with said first font.

2. The system of claim 1 wherein the means for inserting comprises selectively placing said marker within the text document at the beginning of the selected portion and at the end of the selected portion of the text document.

3. The system of claim 1 wherein the marker comprises a printer control selectively placed within the text document to designate the selected portion of said text document.

4. The system of claim 1 wherein the means for changing the specific sequence comprises a local storage for storing in a first sequence the data stream in a matrix, and accessing the data stream from the matrix in a second sequence.

5. The system of claim 1 further comprising means for printing at least one superscript in said selected portion of text in said selected orientation.

6. The system of claim 1 further comprising means for printing, in letter quality mode, at least one subscript in said selected portion of text in said selected orientation.

7. The system of claim 1 further comprising means for printing, in letter quality mode, at least one character in emphasis mode in said selected portion of text in said selected orientation.

8. A method for controlling the presentation of a text document, represented by a data stream having a specific sequence from a processing system to a printer, said method comprising:

inserting, by a user, a marker into said text document for designating a selected portion of said text document;

changing in said processing system the specific sequence of a portion of said data stream representing said designated portion of text, thereby electronically rearranging that portion of said data stream corresponding to said selected portion of said text document; and intermixing normal characters and rotated characters independently within a page boundary of said text document by printing a plurality of characters representing said specific sequence of the data stream with a first font electronically representative of normal characters, said first font being resident in said printer and by printing a plurality of characters representing said changed specific sequence of the portion of the data stream with a second font electronically representative of rotated characters, said second font being resident in said printer.

* * * * *